United States Patent [19]
Noto et al.

[11] Patent Number: 6,164,780
[45] Date of Patent: Dec. 26, 2000

[54] IMAGE DISPLAY APPARATUS

[75] Inventors: Goro Noto, Tokyo; Yasuhiro Toyoda, Ohmiya, both of Japan

[73] Assignee: Canon Kabushiki Kaisha, Tokyo, Japan

[21] Appl. No.: 09/141,753

[22] Filed: Aug. 28, 1998

[30] Foreign Application Priority Data

Sep. 1, 1997  [JP]  Japan ..................................... 9-236142
Jul. 24, 1998  [JP]  Japan ................................... 10-209357

[51] Int. Cl.[7] .................................................... G03B 21/14
[52] U.S. Cl. ................................ 353/122; 353/97; 353/75
[58] Field of Search .................................. 353/74, 75, 97, 353/119, 122, 25, 26 A, 27 A, 26 R; 349/25, 29, 30, 58, 64, 2, 12

[56] References Cited

U.S. PATENT DOCUMENTS 3,824,008   7/1974   Smith, Jr. .
5,004,336   4/1991   Saijo et al. ................................. 353/79
5,488,496   1/1996   Pine ........................................... 359/63
5,534,955   7/1996   Tuchida et al. ............................ 353/88
5,993,006   11/1999  Takeuchi et al. ......................... 353/75

*Primary Examiner*—William Dowling
*Attorney, Agent, or Firm*—Fitzpatrick, Cella, Harper & Scinto

[57] ABSTRACT

An image display apparatus includes a storage display element having a screen portion which receives image light from its back side and stores and displays an image, and a light blocking mechanism. The light blocking mechanism is capable of being switched over between a light-blocked state in which the light blocking mechanism blocks light incident on the front side of the screen portion of the storage display element to shut off incidence of external light on the screen portion, and an observation-possible state in which the light blocking mechanism unblocks light incident on the front side of the screen portion of the storage display element.

23 Claims, 29 Drawing Sheets

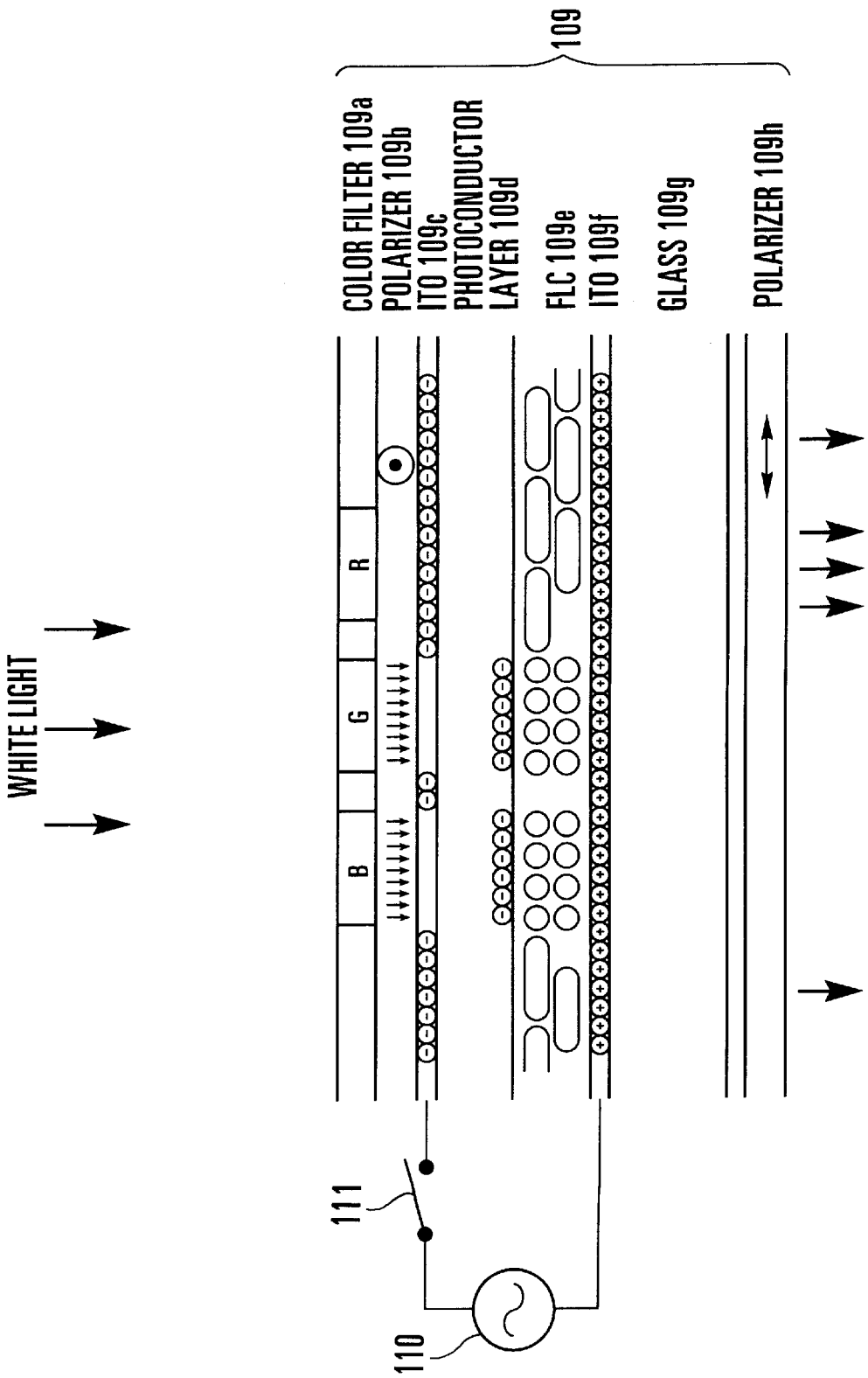

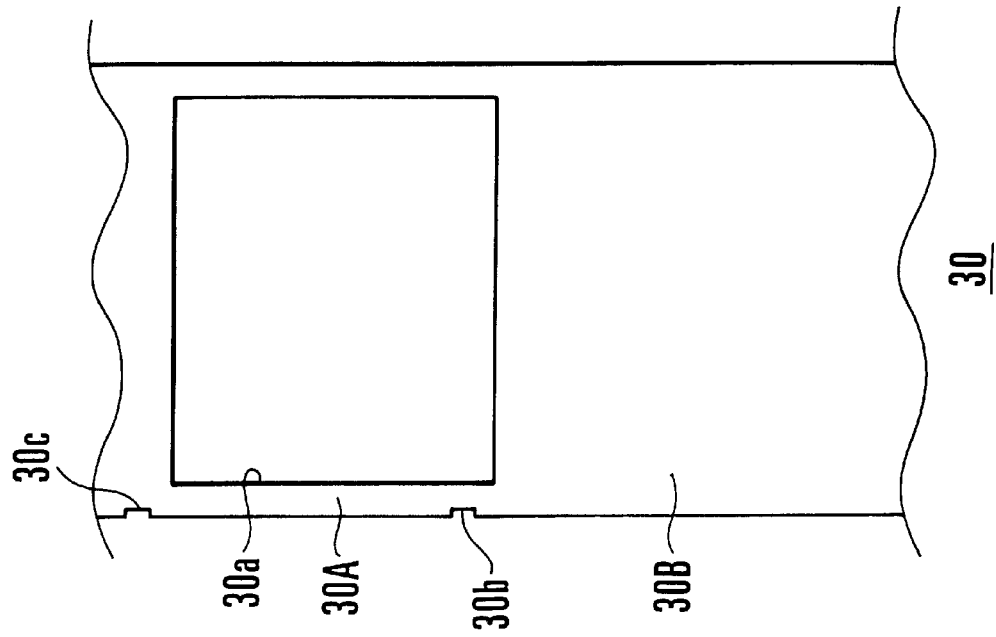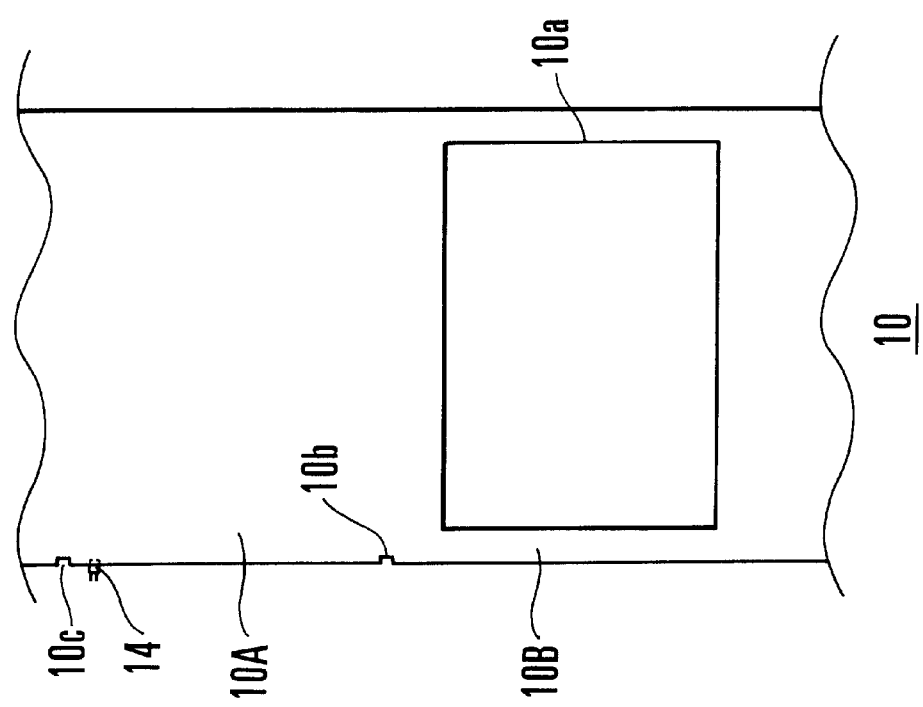

IMAGE DISPLAY APPARATUS

BACKGROUND OF THE INVENTION

1. Field of the Invention

The present invention relates to an image display apparatus capable of storing and displaying an image.

2. Description of Related Art

There is an image display apparatus arranged to convert a negative image recorded on a developed film into an electrical signal by means of a CCD camera and display an image represented by the electrical signal on a CRT or a liquid crystal display. There is also an image display apparatus arranged to optically project an image from a developed positive film onto a dedicated screen.

However, the apparatus using a CCD camera is not suited to the applications of displaying silver-halide photographs, because the density of pixels of a display or a CCD which serves as image pickup means is coarse to such an extent that, for example, the face of a photographed person cannot be identified. In addition, the amount of light transmitted through a developed negative film is less than 10% for each average scene, and if such a negative image is to be magnified and projected, the necessary amount of light becomes excessively large. This leads to the problem that an image display apparatus of excessively large size is needed.

On the other hand, it is not easy for general users to use an image display apparatus for positive film, because they are forced to carefully select photographic conditions during photography with positive film. Furthermore, as compared with negative film, positive film is not favorable to general users in terms of cost and time, because, for example, positive film needs a time-consuming development process and the printing of a photographed image from a desired frame requires an extra time-consuming process.

It has been proposed to provide an image display apparatus which is capable of solving the above-described disadvantages and is suited to photograph stands, electronic albums or the like. This type of image display apparatus is arranged to optically project a negative image on a display screen, and in such image display apparatus, a spatial light modulator (hereinafter referred to as the SLM) which can reverse a negative image is used as a screen so that an image recorded on negative film which is commonly used by general users can be easily viewed. In addition, in such image display apparatus, a ferroelectric liquid crystal (hereinafter referred to as the FLC) having a memory function is used as the liquid crystal of the SLM, and a negative image is instantaneously written to the SLM by using a flash device of the type which is used in cameras or the like. A user can observe the written image by means of illumination with reading light.

FIGS. 13 and 14 show the previously proposed image display apparatus. FIG. 13 shows the entire construction of an image display apparatus 201. In the apparatus shown in FIG. 13, a developed negative film 203 which is drawn from a film cartridge is indexed to an aperture position (which is shown in FIG. 13) on a frame-by-frame basis by a known film winding mechanism. A diffuser 204 which has milk white diffuses light emitted from a flash device 205 (to be described later) and uniformly illuminates the negative film 203.

The flash device 205 is of a type similar to that used in cameras or the like, and includes a xenon tube, a reflector, a light emission circuit and the like and emits light in response to a trigger signal supplied from a known microprocessor (not shown).

An orange base color eliminating filter 206 performs the function of eliminating the color of an orange base from a negative image, and is composed of an optical filter having blue which is the complementary color of orange.

A projecting lens 207 projects a negative image recorded on the negative film 203 onto an SLM 209 (to be described later) via a reflecting mirror 208 at a predetermined magnification.

The SLM 209 includes a color filter of pure colors or complementary colors, an ITO (indium tin oxide) layer which constitutes one transparent electrode, a photoconductor layer made from an organic semiconductor film or the like, a liquid crystal layer made of a ferroelectric liquid crystal (FLC) or the like, an alignment film, an ITO layer which constitutes another transparent electrode, opposed glasses, and opposed polarizers. These layers are stacked one on another in such a manner that the layers are sandwiched between the opposed glasses and the opposed polarizers. If an image is projected onto the back surface of the SLiM 209 with a predetermined voltage being applied across the transparent electrodes, the image is stored in the liquid crystal layer, and the stored image is held even after the application of the predetermined voltage has been stopped. Then, if the back surface of the SLM 209 is illuminated with a reading illumination lamp 212, a user can view the image stored in the liquid crystal layer on the front surface of the SLM 209. The reading illumination lamp 212 is a straight tube lamp of the type which is widely used in flat displays or the like.

The operation of the image display apparatus 201 will be described below with reference to the flowchart of FIG. 14. If a film cartridge which accommodates the negative film 203 having images which the user desires to view is mounted in the image display apparatus 201 by the user (S501), the image display apparatus 201 performs a thrust operation for feeding the negative film 203 from the film cartridge, and positions the first frame of the negative film 203 at the aperture position of the image display apparatus 201 and stops the thrust operation (S502). In this state, the image display apparatus 201 enters a standby mode for waiting for a signal to be sent from any of individual switches (not shown) (S503).

In this state, if the image display apparatus 201 receives a signal indicative of an instruction to advance the negative film 203 up to an intermediate frame, for example, from a remote controller (S504), the image display apparatus 201 positions a specified frame at the aperture position (S505) and enters a standby mode for waiting for a command to display the image of the specified frame (S506).

In this state, if the image display apparatus 201 receives a display command from the user (S507), the image display apparatus 201 turns on a power source switch (not shown) in order to erase the displayed image of the previous frame (S508), and turns on the reading illumination lamp 212 (S509), and then applies a reverse electric field to that applied during writing, to the electrodes of the SLM 209 (S510). Thus, the FLC molecules of all the cells of the SLM 209 are reversed and brought to a laterally oriented state, whereby the FLC is brought to its neutral state (S511). After enough time to bring the FLC molecules of all the cells to the laterally oriented state has elapsed, the image display apparatus 201 turns off the power source switch to turn off the reading illumination lamp 212 (S512 and S513).

Then, the image display apparatus 201 performs the operation of writing a new image. It is assumed that the image display apparatus 201 is placed on the top of a desk in an office or on a shelf in a home and is illuminated with a brightness of approximately several hundred lux. The external light is reduced to approximately half in intensity by passing through the polarizer and the liquid crystal layer of the SLM 209, and then enters the photoconductor layer. However, if the SLM 209 is not energized, no electric field is not applied to the ITO films, and hence the FLC does not respond.

In this state, if the image display apparatus 201 turns on the power source switch (S514), a forward electric field which is required to write an image is applied to the ITO films by the power source (S515). Then, the image display apparatus 201 causes the flash device 205 to emit flash light (S516) and projects the image recorded on the negative film 203 onto the SLM 209 by means of the flash light so that the SLM 209 memorizes the projected image.

This writing operation, which is performed with the SLM 209 being exposed to external light in the above-described manner, must be rapidly performed under conditions which allow projected light to exhibit a prescribed S/N ratio with respect to external light. However, since the flash emission performed in Step S516 comes to an end in approximately 500 $\mu$sec, the operation of turning on the power source switch in Step S515 is also performed in a time of approximately the same length and at approximately the same timing. After the completion of the flash emission, the image display apparatus 201 immediately turns off the power source switch to cut the electric field (S517). After that, the image display apparatus 201 turns on the reading illumination lamp 212 so that the user can view the image stored in the SLM 209, by means of transmitted illumination (S518).

After that, the image display apparatus 201 enters the standby mode for receiving the next command (S503), and the user can continue to view the image stored in the SLM 209 which has been set in the above-described operation.

In accordance with the above-described sequence, it is possible to write an image to the SLM 209 by supplying electrical potential to the photoconductor layer of the SLM 209 in synchronism with the flash emission of the flash device 205 for only a slight period of time.

As another image display apparatus, the still image display shown in FIGS. 15 to 17 has been proposed. The following description will focus on points which differ from the above-described features of the image display apparatus 201. As shown in FIGS. 15 to 17, a still image display 301 includes various parts which will be described later, in built-in form. A scanner unit 310 is provided with a cartridge chamber (not shown), and a film cartridge 302 is mounted in the cartridge chamber. A negative film 303 is fed out from the film cartridge 302 by a known film transporting mechanism, and a photographed-image frame 303a specified by a user is fed into the optical path of a line CCD 316 which will be described later.

A scanning illuminating light source 314 generally includes a three-wavelength tube (a fluorescent tube of the type whose R, G and B wavelengths are accurately balanced) 314a, a reflector 314b, and a diffuser located at a position which is invisible in FIG. 15. The scanning illuminating light source 314 is disposed at a position where it can be kept in approximately close contact with the negative film 303.

A projecting lens 315 serves to project an image recorded on the negative film 303 onto the line CCD 316 as an image of reduced size, and includes in built-in form predetermined mechanisms (not shown) such as a known autofocus mechanism and an iris device which is an exposure adjustment mechanism.

The line CCD 316 has three R, G and B lines. The information outputted from the respective R, G and B lines is inputted to A/D converters 317 via shift registers, and the output information is converted into digital information by the respective A/D converters 317. After that, the digital information is inputted to a mixing circuit 318, and the output from the mixing circuit 318 is inputted to a laser driving circuit 319. The output of the laser driving circuit 319 is connected to a semiconductor laser 322 (which will be described later) to drive the semiconductor laser 322.

The semiconductor laser 322 serves to emit near infrared light, and includes an erasing laser 322a for erasing an old image which is previously written to an SLM 309 and a writing laser 322b for writing image data which is newly sent from the scanner unit 310.

In the present still image display, the erasure of an old image from the SLM 309 and the writing of a new image to the SLM 309 are performed by a so-called wipe change-over method which causes the boundary between the old and new images to apparently move over the screen. Specifically, the reverse electric field to that applied during the writing of the old image is applied to the patterned portion of each of the ITO films that is several to some tens of lines previous to the new image to be written, and the infrared light of the erasing laser 322a is made to illuminate on a D.C. basis to create a uniform pre-writing state of liquid crystal. Accordingly, if an erasing operation and a writing operation are to be performed with different semiconductor lasers at the same time, it is necessary to apply both plus and minus potentials relative to a common potential to the patterned ITO films, for example, −30 V for an erasing side and +30 V for a writing side with respect to 0 V for a common side (a non-patterned side). At this time, an electric field (an electric field parallel to the FLC) also occurs between −30 V and +30 V, but, as described previously, in order to prevent this electric field from adversely affecting erasing or writing, writing and erasing are performed not between adjacent patterns but between patterns distant from each other by a predetermined amount. Thus, an improvement in S/N ratio is achieved.

Incidentally, since the operation of actually erasing an old image and writing a new image is performed in a portion which is not exposed to external light by being covered with a light blocking plate 328b (to be described later), the user feels that the old image is wiped off the screen by the new image at a position corresponding to the light blocking plate 328b which is passing over the SLM 309.

A first positive lens unit 323 serves to approximately focus the laser light emitted from the laser 322, on a polygonal surface of a polygonal mirror 324. The polygonal mirror 324 is rotatably supported at a shaft 324a by a support mechanism (not shown) and has an external shape having an octahedral mirror surface.

A projecting lens 325 serves to project an image reflected from the polygonal mirror 324, onto the SLM 309, and focuses an image transmitted by the laser 322, on the photoconductor layer of the SLM 309 in accordance with an optical path which passes through a total reflection prism 331 and a total reflection mirror 332.

The rotation of the output shaft of a stepping motor 326 is transmitted to a first helicoid screw shaft 327 which is shown in detail in FIG. 16, thereby causing the first helicoid screw shaft 327 to turn on its axis. Thus, the light blocking plate 328b, which is engaged with a first female helicoid 328 meshed with the helicoid portion of the first helicoid screw shaft 327 and is fitted in a guide groove (not shown) formed in the still image display 301, travels along the top of the SLM 309 in the direction of the corresponding arrow shown in FIG. 17.

The first helicoid screw shaft 327 integrally has a connecting gear portion 327a. The connecting gear portion 327a is meshed with a gear portion 329a of a second helicoid shaft 329 which will be described later, and transmits the rotational driving force of the stepping motor 326 to the second helicoid shaft 329. The second helicoid shaft 329 is rotatably supported on the still image display 301 by a guide member (not shown), and a second female helicoid 330 is screw-connected to the helicoid portion of the second helicoid shaft 329. Accordingly, if the rotation of the stepping motor 326 is transmitted to the second helicoid shaft 329 via the gear portions 327a and 329a, the second female helicoid 330 travels along the bottom of the SLM 309 in the direction of the corresponding arrow shown in FIG. 17.

The leads of the respective threads of the first helicoid screw shaft 327 and the second helicoid shaft 329 are selected to be 2:1 so that as the first female helicoid 328 travels by one stroke, the second female helicoid 330 travels by a half stroke. Accordingly, the optical path length of laser light from the projecting lens 325 for focusing an image on the SLM 309 to the SLM 309 is approximately constant no matter where in the SLM 309 an image is to be written.

The second female helicoid 330 is provided with a prism support portion 330a which supports the triangular prism 331. As shown in FIG. 17, when laser light which has been reflected from the polygonal mirror 324 and passed through the projecting lens 325 enters the triangular prism 331, the triangular prism 331 reflects the laser light twice in its interior to change the direction of the laser light by 180°, and emits the laser light toward the reflection mirror 332. The reflection mirror 332 reflects the laser light to change the direction thereof by 90°, and focuses the laser light on the photoconductor layer of the SLM 309.

The reflection mirror 332 is supported by a support portion (not shown) provided on the first female helicoid 328, and travels integrally with the first female helicoid 328. Accordingly, even if the triangular prism 331 and the reflection mirror 332 respectively travel to the positions 331' and 332' shown in FIG. 17 by the driving force of the stepping motor 326 together with the light blocking plate 328b, the optical path length from the projecting lens 325 to the SLM 309 does not change, as described previously.

The light blocking plate 328b also serves the function of preventing external light from entering the photoconductor layer to which an electric field is applied, through the color filter part and the FLC of the SLM 309 when the laser 322 is erasing an old image or writing a new image.

A detection pattern 341 is used for outputting position information relative to the stripe-shaped ITO films of the SLM 309, and a known photosensor, which is opposed to the detection pattern 341, outputs pulse signals in a pattern corresponding to individual positions. Through these pulse signals, it is possible to detect positions illuminated with laser light outputted from the erasing laser 322a and the writing laser 322b, respectively, so that, by controlling the switching timing of each of the stripe-shaped ITO films, it is possible to apply an electric field in such a manner that the electric field is reversed each time an erasing operation and a writing operation are switched over therebetween.

An external data input terminal 342 is provided for receiving digital image data from the outside, such as CD-ROM data which is inputted via a personal computer (not shown), and the digital image data is inputted to an external data processing circuit 344. The external data processing circuit 344 converts the digital image data into optimum image data which can be written to and displayed on the SLM 309, and outputs the obtained image data to the mixing circuit 318 so that the laser 322 can be made to perform erasure of an old image and writing of a new image.

A backlight 343 includes a light source made of a three-wavelength fluorescent lamp or the like, and a known reflection light guide plate. This backlight 343 is turned on when a user is to view a written image after an image has been written to the SLM 309, and provides the user with an image illuminated with good backlight illumination.

However, in the previously described image display apparatus 201, since the writing of an image is performed with the SLM remaining exposed to external light, if the influence of external light which serves as noise is to be eliminated or a clear image is to be recorded, it is necessary to cause the flash device 205 to emit a large amount of writing light, i.e., a flash device of large size is needed as the flash device 205. In addition, since it is necessary to reduce the F number of the projecting lens 207, the lens diameter of a projecting optical system becomes large.

On the other hand, the above-described still image display 301, which is arranged to sequentially write an image to the SLM 309 in a form corresponding to the stripe-shaped ITO films, has the disadvantage that the still image display 301 requires a longer writing time than the image display apparatus 201. In addition, since the still image display 301 has the structure in which the light blocking plate 328b and the triangular prism 331 as well as the reflection mirror 332 are moved on the opposite sides of the SLM 309 according to the operation of writing an image, a mechanical structure associated with the SLM 309 is complicated.

BRIEF SUMMARY OF THE INVENTION

One object of the present invention is to provide an image display apparatus which receives image light from its back side and stores an image as well as can observably display the stored image on its front side, the image display apparatus being provided with a light blocking mechanism which can be switched over between a light-blocked state which blocks the incidence of external light on the entire front surface of a screen portion and an observation-possible state which allows a user to observe the stored image.

Other objects of the present invention will become apparent from the following detailed description of preferred embodiments of the present invention, taken in conjunction with the accompanying drawings.

BRIEF DESCRIPTION OF THE SEVERAL VIEWS OF THE DRAWING

FIGS. 3(a) and 3(b) are schematic explanatory views of the SLM of the image display apparatus;

FIGS. 12(a) and 12(b) are schematic developed views respectively showing the light blocking member and the diffusion member of the image display apparatus according to the second embodiment;

DETAILED DESCRIPTION OF THE INVENTION

Preferred embodiments of the present invention will be described below in detail with reference to the accompanying drawings.

(First Embodiment)

Figure 1:
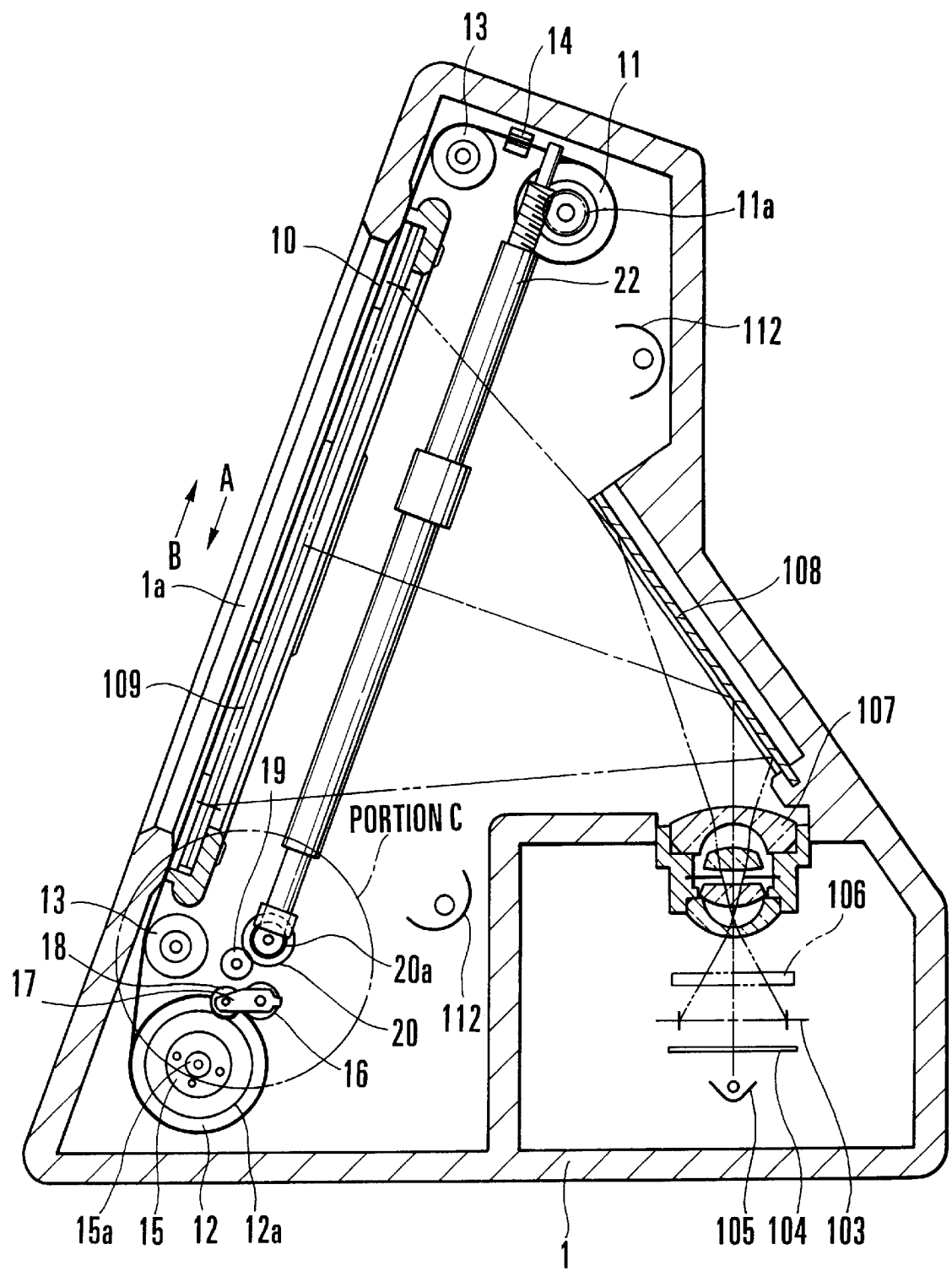
FIG. 1 is a diagrammatic cross-sectional view of an image display apparatus according to a first embodiment of the present invention.
Figure 2:
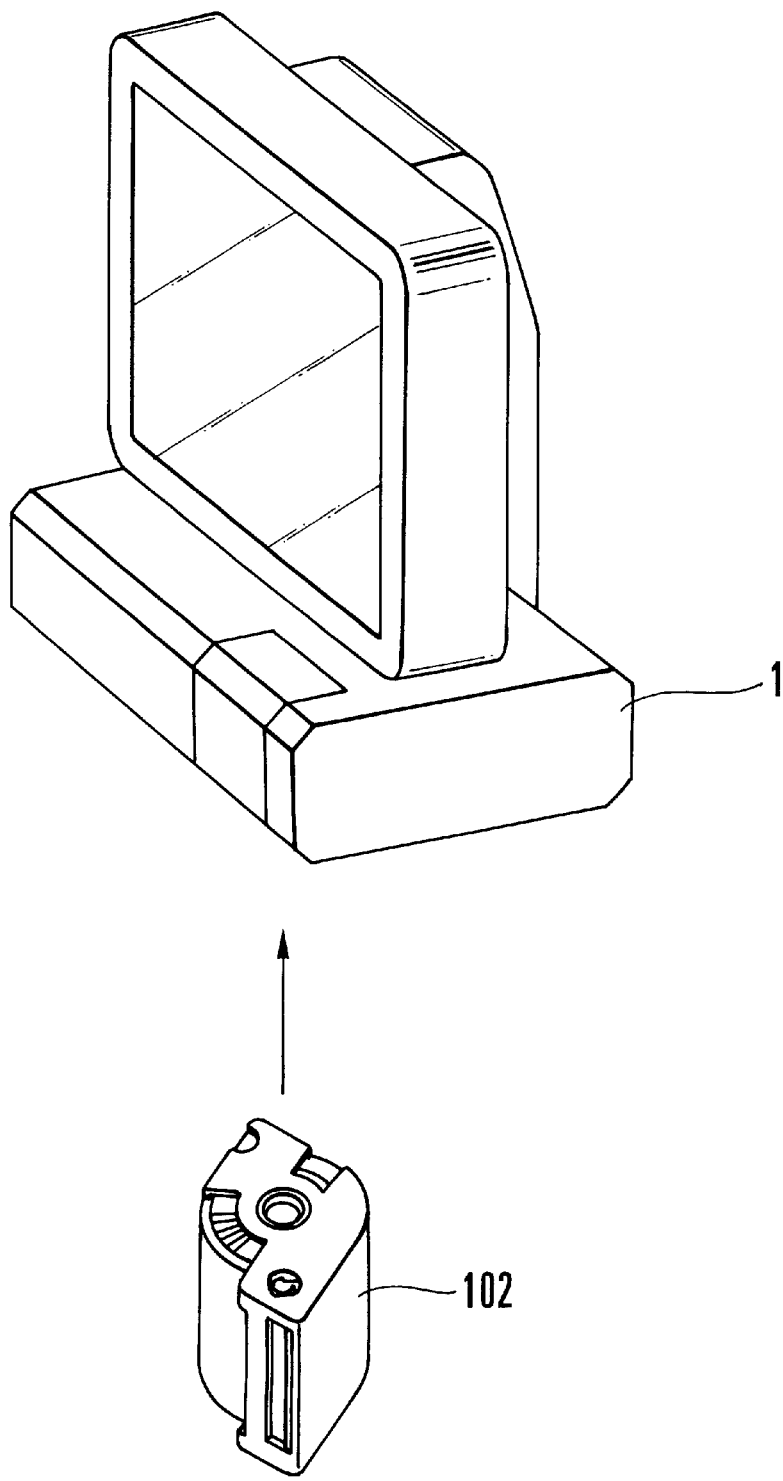
FIG. 2 is a diagrammatic view showing the manner of use of the image display apparatus.

FIGS. 1 to 10 show an image display apparatus according to a first embodiment of the present invention, and FIG. 2 diagrammatically shows the manner of use of an image display apparatus 1. As shown in FIG. 2, if a film cartridge 102 which accommodates a developed negative film (such as an IX240 film) is mounted in the image display apparatus 1, the image display apparatus 1 displays a photographed image as a negative-to-positive reversed high-definition image so that a user can view the image.

In the apparatus shown in FIG. 1, a developed negative film 103 which is drawn from the mounted film cartridge 102 is indexed to the aperture position shown in FIG. 1 on a frame-by-frame basis by a known film winding mechanism. A diffuser 104 which has milk white diffuses uniformly light emitted from a flash device 105 (to be described later) and illuminates the negative film 103.

Figure 7:
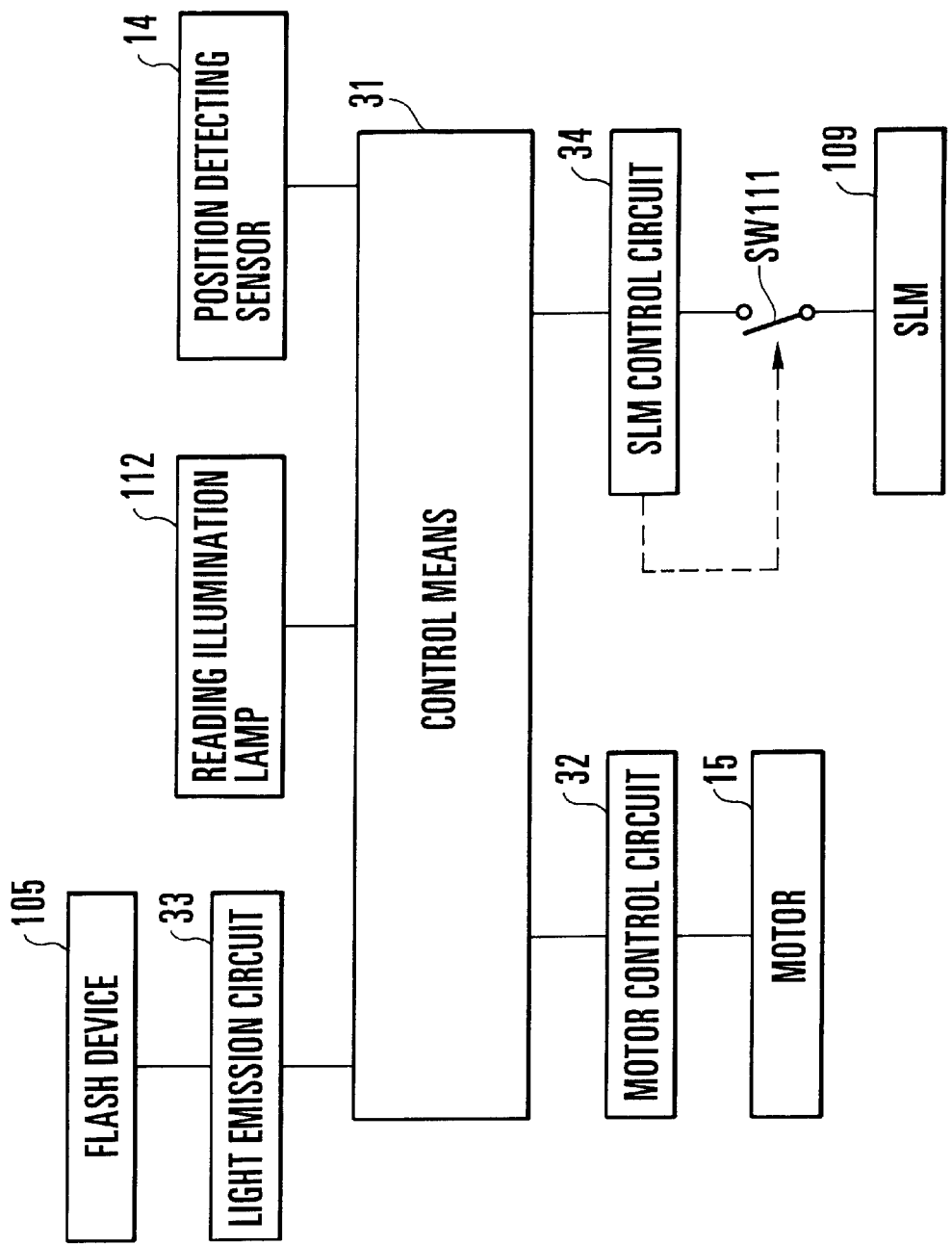
FIG. 7 is a block diagram of the electrical circuit of the image display apparatus.

The flash device 105 is of a type similar to that used in cameras or the like, and includes a xenon tube (not shown), a reflector, a light emission circuit 33 (which is shown in FIG. 7) and the like.

An orange base color eliminating filter 106 performs the function of eliminating the color of an orange base from a negative image, and is composed of an optical filter having blue which is the complementary color of orange.

Figure 3A:
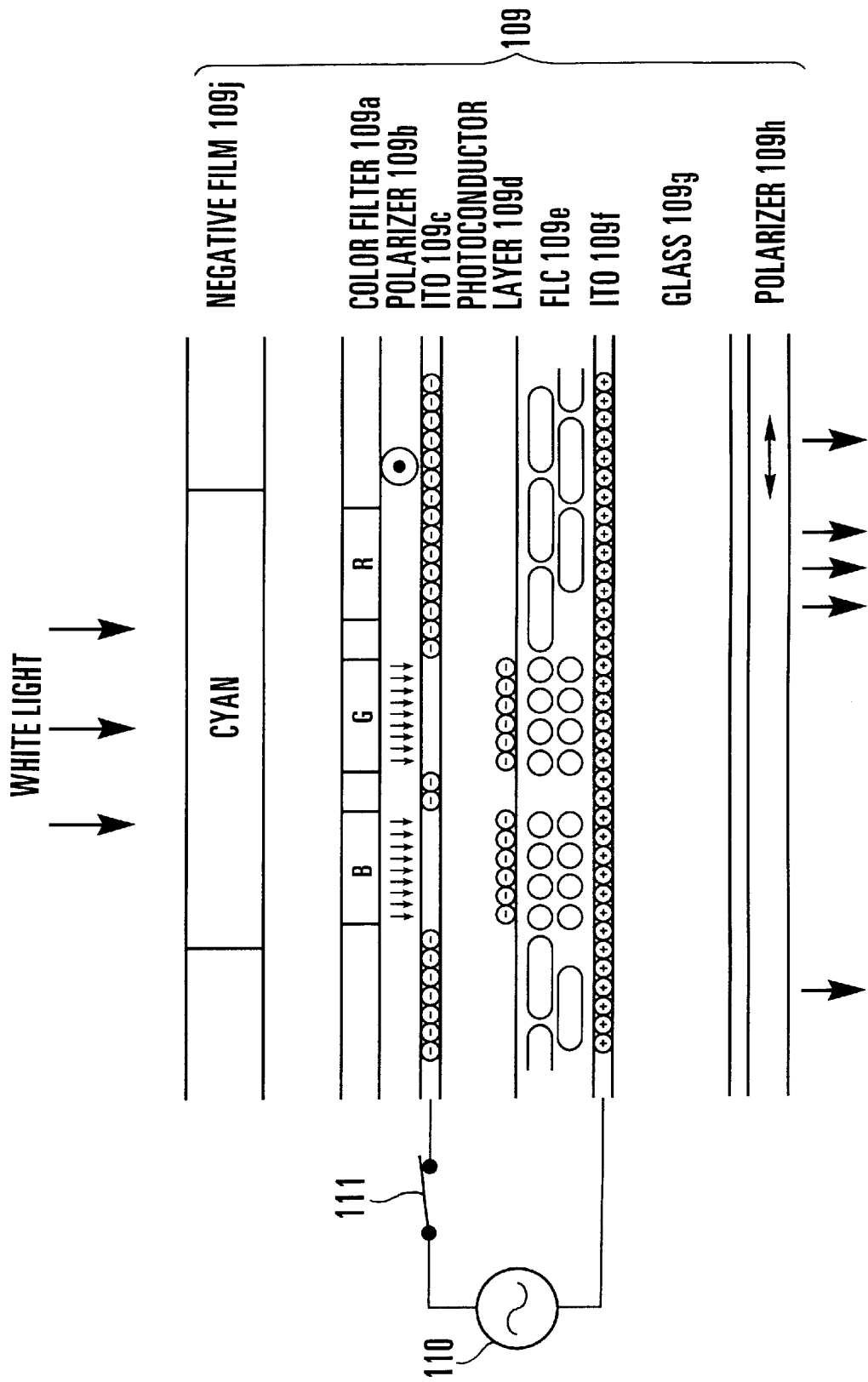

A projecting lens 107 projects a negative image recorded on the negative film 103 onto an SLM 109 (to be described later) via a reflecting mirror 108 at a predetermined magnification. The construction of a screen portion (an area which stores and displays an image) of the SLM 109 will be described below with reference to FIGS. 3(a) and 3(b). FIG. 3(a) shows the state of the SLM 109 to which an image is being written, while FIG. 3(b) shows the state of the SLM 109 which allows an image displayed thereon to be observed by the user.

Referring to FIGS. 3(a) and 3(b), a color filter 109a has pure colors or complementary colors, and is of a fine-mesh type which is used with a CCD image pickup device for a video camera or the like. The use of such a color filter enables the user to observe a film image without degradation.

The polarizers 109b and 109h constitute a cross Nicol arrangement in which the polarization direction of the polarizer 109b is perpendicular to the sheet surface of each of FIGS. 3(a) and 3(b), while the polarization direction of the polarizer 109h is parallel to the sheet surface of each of FIGS. 3(a) and 3(b). A liquid crystal layer which will be described later is sandwiched between the polarizers 109b and 109h.

Transparent electrically conductive films (hereinafter referred to as ITO films) 109c and 109f are typically composed of indium tin oxide, and potentials of polarities different from each other are applied to the respective ITO films 109c and 109f from an A.C. power source 110 and a circuit (not shown) for driving the A.C. power source 110 when a switch 111 is turned on.

A photoconductor layer 109d is formed of a photodiode film such as an amorphous film, OPC (organic semiconductor film) or the like. One surface of the photoconductor layer 109d is in intimate contact with the ITO film 109c, while the other surface of the photoconductor layer 109d is in intimate contact with an FLC layer 109e which will be described later.

The FLC layer 109e is the liquid crystal layer, and one surface of the FLC layer 109e is in intimate contact with the photoconductor layer 109d as described above, while the other surface of the FLC layer 109e is in intimate contact with the ITO film 109f.

A glass 109g serves the function of sealing the liquid crystal layer and protecting the other layers.

Reference numeral 109j denotes a virtual image of a negative film image which is projected by the projecting lens 107.

If image light is projected onto the color filter 109a (the back surface) of the SLM 109 having the above-described construction with a predetermined voltage being applied to each of the ITO films 109c and 109f, an image is stored in the FLC layer 109e, and the stored image is held even after the application of the voltage has been stopped. Then, if the back surface of the SLM 109 is illuminated with reading light from the reading illumination lamp 112 shown in FIG. 1, the user can view the image stored in the FLC layer 109e, through the glass 109g and the polarizer 109h on the front surface of the SLM 209. The reading illumination lamp 112 is a straight tube lamp of the type which is widely used in flat displays or the like.

Referring to FIG. 1, a strip sheet-like light blocking member 10 is disposed on the side of the front surface of the SLM 109. The light blocking member 10 can be transported in its longitudinal direction by the rotational driving of winding shafts 11 and 12. Guide shafts 13 which give appropriate tension to the light blocking member 10 to impart flatness thereto and which also serve as guides which allow the light blocking member 10 to be wound around the winding shaft 11 or 12 are respectively disposed in the vicinity of the winding shafts 11 and 12.

Figure 4:
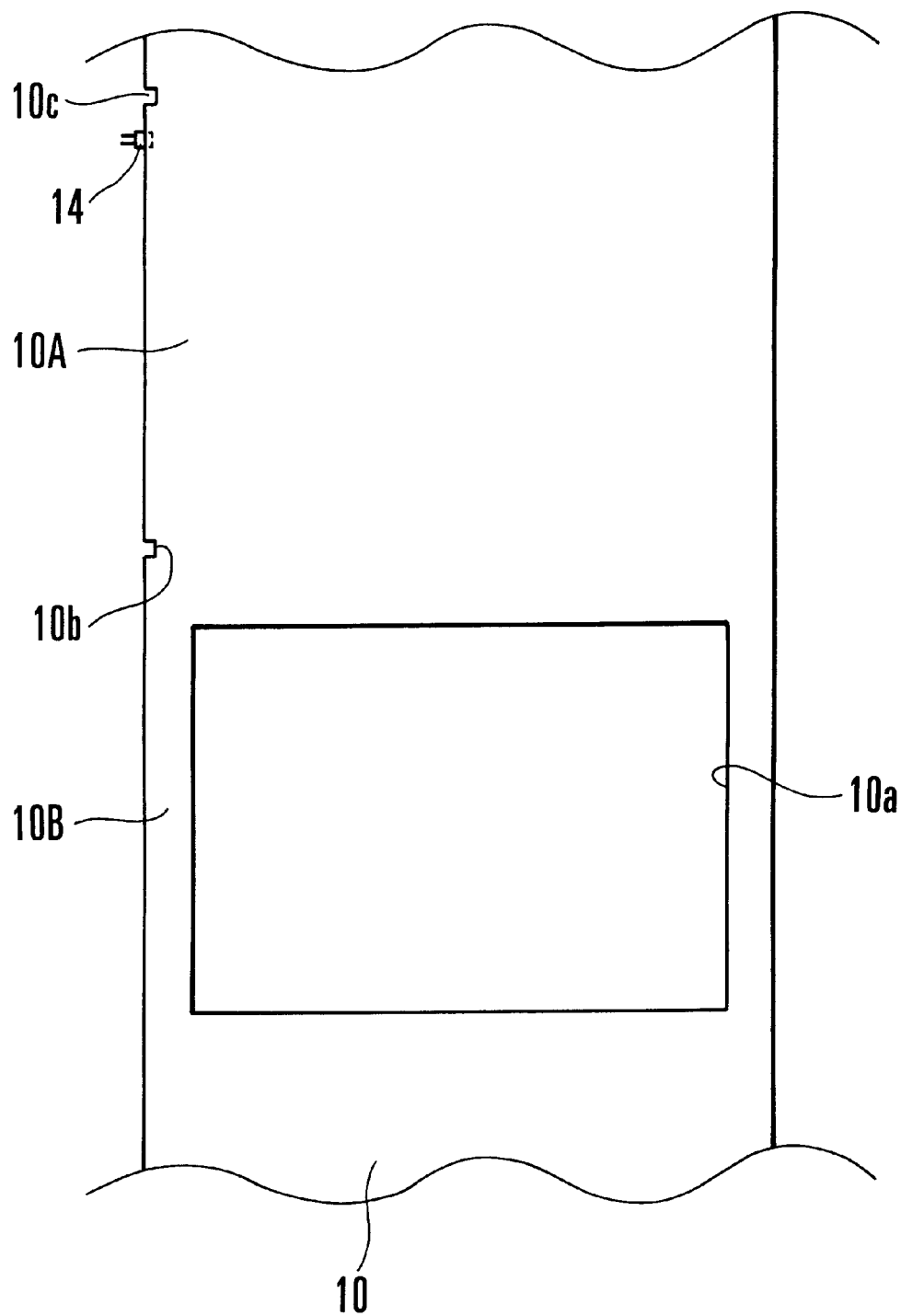
FIG. 4 is a schematic developed view of the light blocking member of the image display apparatus.

As shown in FIG. 4, the light blocking member 10 has a light blocking portion 10A and an observation portion 10B which are formed in line in the longitudinal direction (the direction in which to transport the light blocking member 10). The light blocking portion 10A prevents external light from being made incident on the entire front surface of the screen portion of the SLM 109 through an image observation window 1a of the image display apparatus 1 during the writing of an image to the SLM 109, and the observation portion 10B has an opening portion 10a formed to allow the user to observe the image on the SLM 109 through the image observation window 1a. The opening portion 10a is formed to have shorter and longer sides which are greater than the corresponding ones of the image observation window 1a, whereby the observer can observe the entire image in the screen portion of the SLM 109 through the opening 1a without being hindered by the light blocking member 10.

The light blocking member 10 has notches 10c and 10b which are respectively formed in upper and lower portions of the light blocking portion 10A at one widthwise end thereof. As shown in FIGS. 1 and 4, a position detecting sensor 14, such as a photointerrupter which detects the notches 10c and 10b, is disposed at a position which opposes the widthwise end of the light blocking member 10 in the image display apparatus 1. When the notch 10c is detected by the position detecting sensor 14, the light blocking portion 10A is set to a position (light blocking position) where it covers the image observation window 1a, while when the notch 10b is detected by the position detecting sensor 14, the opening portion 10a of the observation portion 10B is set to a position (observation position) which is superposed on the image observation window 1a.

Then, a mechanism for driving the winding shafts 11 and 12 will be described below with reference to FIGS. 1, 5 and 6. A gear portion 11a is integrally formed at one end of the winding shaft 11, while a gear portion 12a is integrally formed at one end of the winding shaft 12.

The output shaft of a motor 15 is integrally provided with a pinion gear 15a, and the rotation of the pinion gear 15a is transmitted to a gear 16 via a gear train (not shown). A lever 17 is rotatable coaxially with the gear 16, and a gear 18 having a known friction mechanism is held at an end portion 17a of the lever 17.

Figure 5:
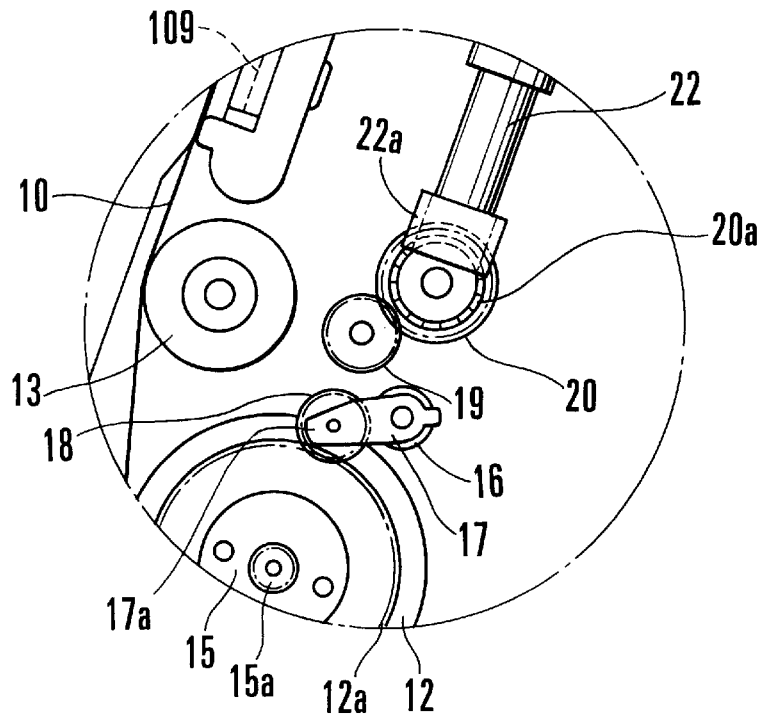
FIG. 5 is an enlarged view of a portion (a portion C of FIG. 1) of a driving mechanism for the light blocking member.
Figure 6:
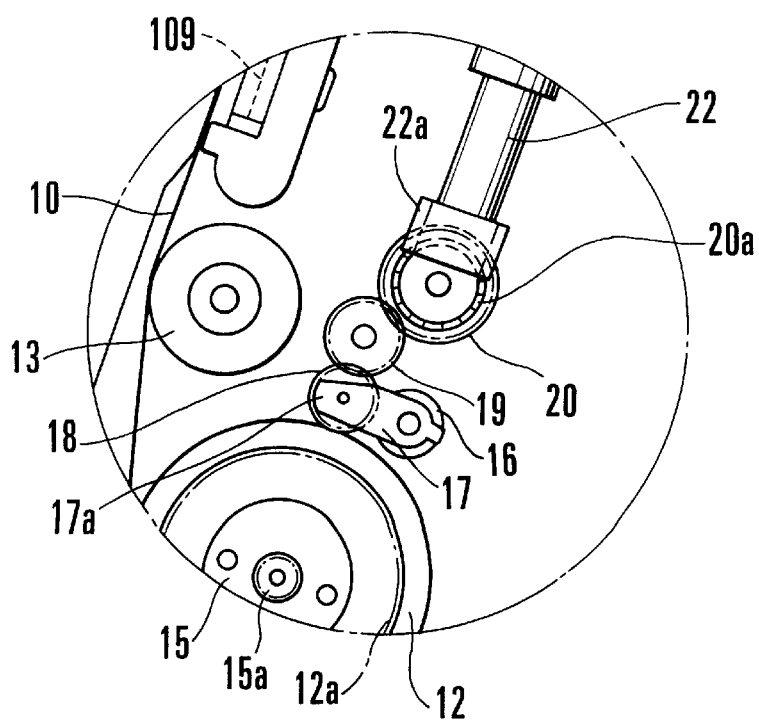
FIG. 6 is an enlarged view of the portion (the portion C of FIG. 1) of the driving mechanism for the light blocking member.

If the motor 15 is forwarded and the gear 16 rotates counterclockwise as viewed in each of FIGS. 1, 5 and 6, the lever 17 turns counterclockwise by a friction function, as shown in FIG. 5, so that the gear 18 meshes with a gear portion 12a of the winding shaft 12. The rotation of the motor 15 is transmitted to the gear portion 12a via the gears 16 and 18 and the winding shaft 12 is driven to rotate counterclockwise. Thus, the light blocking member 10 is wound around the winding shaft 12 while travelling in the direction of the arrow A shown in FIG. 1. Then, when the notch 10c is detected by the position detecting sensor 14, the motor 15 is stopped and the light blocking portion 10A is set to the aforesaid light blocking position.

On the other hand, if the motor 15 is reversed and the gear 16 rotates clockwise as viewed in each of FIGS. 1, 5 and 6, the lever 17 turns clockwise by the friction function, as shown in FIG. 6, so that the gear 18 meshes with a gear 19 secured to the body of the apparatus. A gear 20 is meshed with the gear 19 and is provided with a crown gear 20a having gear teeth on the upper side of the gear 20 as viewed in FIG. 6. The crown gear 20a is meshed with a pinion gear 22a formed at the lower end of a connecting shaft 22. A worm gear is formed at the upper end of the connecting shaft 22, and is meshed with the helical gear portion 11a of the winding shaft 11. The reverse rotation of the motor 15 is transmitted to the helical gear portion 11a via the gears 16, 18, 19 and 20 and the connecting shaft 22, and the winding shaft 11 is driven to rotate clockwise. Thus, the light blocking member 10 is wound around the winding shaft 11 while travelling in the direction of the arrow B shown in FIG. 1. Then, when the notch 10b is detected by the position detecting sensor 14, the motor 15 is stopped and the observation portion 10B is set to the aforesaid observation position.

FIG. 7 shows an electrical circuit of the image display apparatus according to the first embodiment. The electrical circuit shown in FIG. 7 includes control means 31, such as a CPU, which is responsible for the entire control sequence of the image display apparatus 1, a motor control circuit 32 for controlling the motor 15 to forward or reverse it, in response to a motor control signal from the control means 31, a light emission circuit 33 for controlling the light emission of the flash device 105 in response to a trigger signal from the control means 31, and an SLM control circuit 34 for switching on or off the supply of electric power to the SLM 109 in response to a switch control signal from the control means 31.

Figure 8:
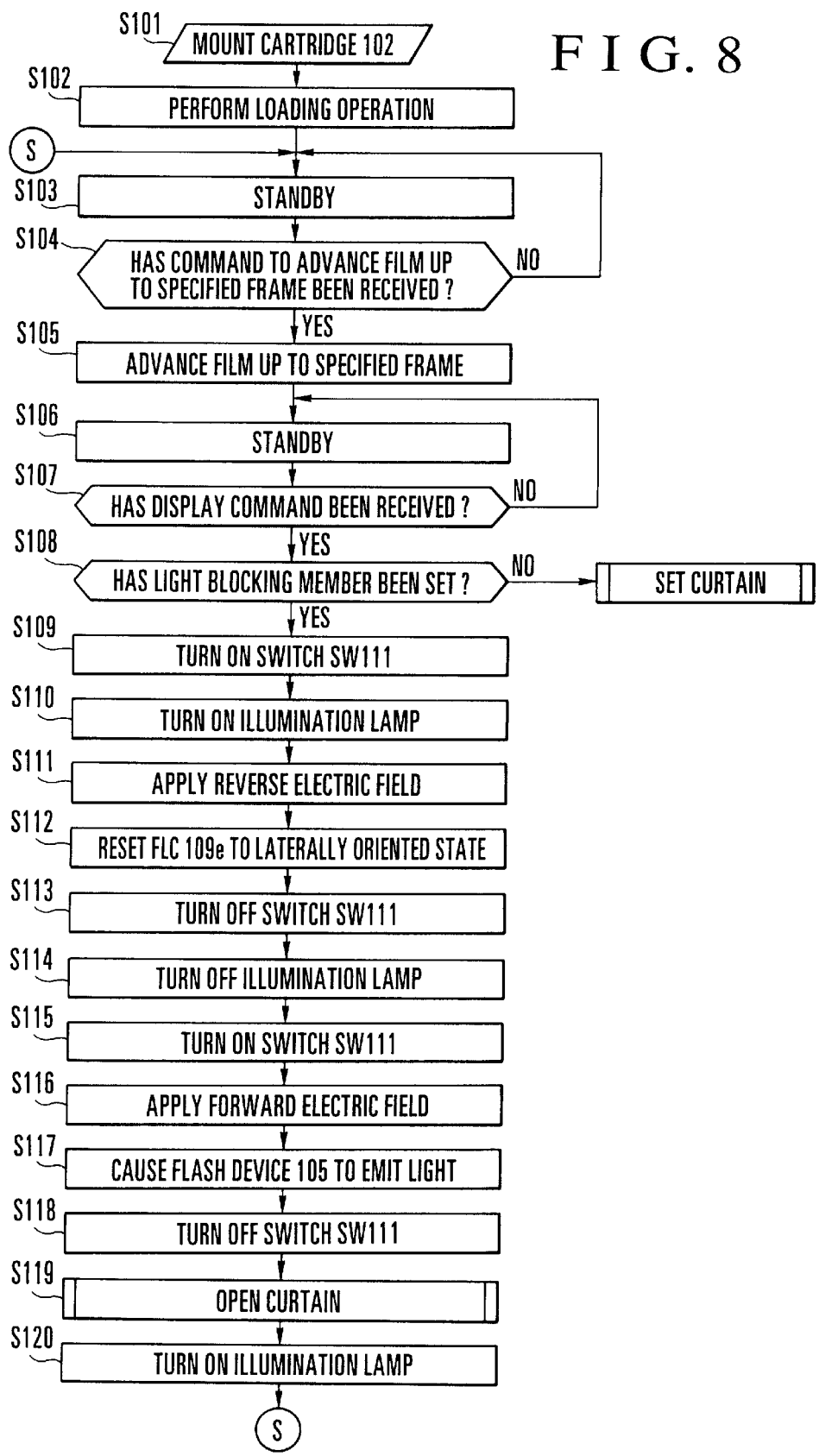
FIG. 8 is a flowchart of the operation of the image display apparatus.
Figure 9:
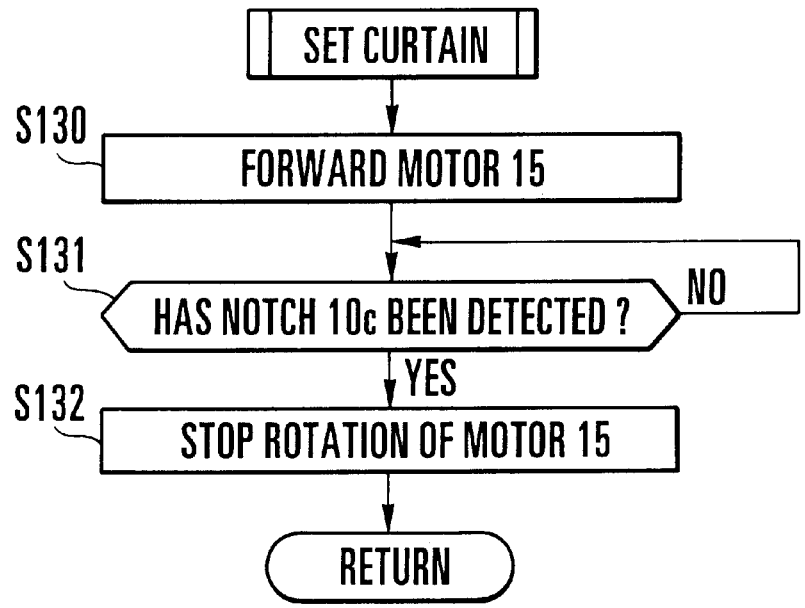
FIG. 9 is a flowchart of the operation of the image display apparatus.
Figure 10:
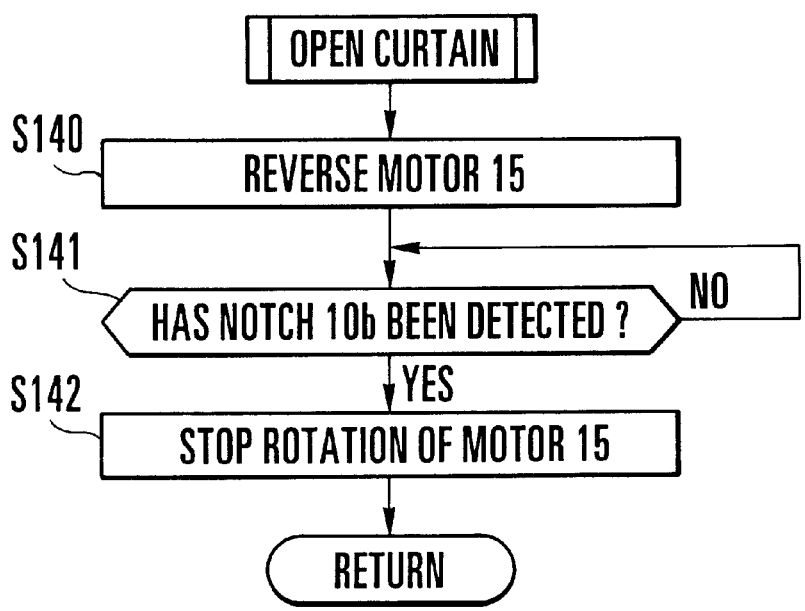
FIG. 10 is a flowchart of the operation of the image display apparatus.

The image displaying operation of the image display apparatus 1 (the control means 31) according to the first embodiment will be described below with reference to the flowchart of FIG. 8. If the film cartridge 102 which accommodates the developed negative film 103 having images which the user desires to view is mounted in the image display apparatus 1 by the user (S101), the image display apparatus 1 performs a thrust operation for feeding the negative film 103 from the film cartridge 102, and positions the first frame of the negative film 103 at the aperture position of the image display apparatus 1 and stops the thrust operation (S102). In this state, the image display apparatus 1 enters a standby mode for waiting for a signal to be sent from any of individual switches (not shown) (S103).

In this state, if the image display apparatus 1 receives a signal indicative of an instruction to advance the negative film 103 up to an intermediate frame, for example, from a remote controller (S104), the image display apparatus 1 positions a specified frame at the aperture position of the image display apparatus 1 (S105) and enters a standby mode for waiting for a command to display the image of the specified frame (S106).

In this state, if the image display apparatus 1 receives a display command from the user (S107), the image display apparatus 1 checks whether the notch 10c has been detected by the position detecting sensor 14 (S108), so that the image display apparatus 1 can perform erasure of a previously displayed frame image and writing of a new image with the light blocking member 10 (the light blocking portion 10A) being set to the light blocking position. If the light blocking member 10 is not set to the light blocking position, the process proceeds to the curtain setting subroutine shown in FIG. 9.

In the curtain setting subroutine, first of all, the motor 15 is forwarded so that the opening portion 10a of the light blocking member 10 can be completely withdrawn from the image observation window 1a (S130). The rotation of the motor 15 is transmitted to the gear portion 12a of the winding shaft 12 by the above-described driving mechanism, and the winding shaft 12 rotates counterclockwise as viewed in each of FIGS. 1 and 5 to wind the light blocking member 10. Thus, the light blocking member 10 travels in the direction of the arrow A shown in FIG. 1, and when the observation portion 10B is wound around the winding shaft 12 and the opening portion 10a is completely withdrawn from the image observation window 1a, the notch 10c of the light blocking member 10 is detected by the position detecting sensor 14 at nearly the same timing, and the position detecting sensor 14 outputs a detection signal (S131). Then, the control means 31 stops the rotation of the motor 15 via the motor control circuit 32 in response to the detection signal (S132).

After it has been confirmed in this manner that the light blocking member 10 has been set to the light blocking position, the image display apparatus 1 turns on the switch SW111 in order to erase the previously displayed frame image (S109), and turns on the reading illumination lamp 112 (S110) and then applies a reverse electric field to that applied during writing, to the electrodes of the SLM 109 by means of the power source (S111). Thus, the molecules of all the cells of the FLC layer 109e of the SLM 109 are reversed and brought to a laterally oriented state, whereby the FLC layer 109e is brought to its neutral (reset) state (S112). After enough time to bring the FLC molecules of all the cells to the laterally oriented state has elapsed, the image display apparatus 1 turns off the switch SW111 (S113) to turn off the reading illumination lamp 112 (S114).

Then, the image display apparatus 1 turns on the switch SW111 (S115) and applies a forward electric field which is required to write an image, to the ITO films 109c and 109f by means of the power source (S116). Then, the image display apparatus 1 causes the flash device 105 to emit flash light (S117) and projects the image recorded on the negative film 103 onto the SLM 109 by means of the flash light so that the SLM 109 stores the projected image.

After the completion of the flash emission, the image display apparatus 1 immediately turns off the switch SW111 to cut the electric field (S118). Then, the process proceeds to the curtain opening subroutine shown in FIG. 10.

In the curtain opening subroutine, first of all, the motor 15 is reversed so that the opening portion 10a of the light blocking member 10 is superposed onto the image observation window 1a (S140). The rotation of the motor 15 is transmitted to the gear portion 11a of the winding shaft 11 by the above-described driving mechanism, and the winding shaft 11 rotates clockwise as viewed in FIG. 1 to wind the light blocking member 10. Thus, the light blocking member 10 travels in the direction of the arrow B shown in FIG. 1, and when the light blocking portion 10A is wound around the winding shaft 11 and the opening portion 10a is superposed onto the image observation window 1a, the notch 10b of the light blocking member 10 is detected by the position detecting sensor 14 at nearly the same timing, and the position detecting sensor 14 outputs a detection signal (S141). Then, the control means 31 stops the rotation of the motor 15 via the motor control circuit 32 in response to the detection signal (S142).

When the light blocking member 10 (the observation portion 10B) is set to the observation position in this manner (S119), the image display apparatus 1 turns on the reading illumination lamp 112 so that the user is allowed to observe the image stored in the SLM 109, by means of transmitted illumination (S120). After that, the process returns to the standby state for waiting for the next command with the image stored in the SLM 109 remaining displayed (S103).

In the above-described image display apparatus 1 according to the first embodiment, it is possible to write a new image to the SLM 109 with a reduced amount of flash emission of the flash device 105 because, during image writing, the flash device 105 is made to emit flash light with the SLM 109 being shielded from external light. In addition, since it is possible to write an image even if the projecting lens 107 does not have a small F number, the lens diameter of a projecting optical system can be made smaller than those of conventional projecting optical systems. Accordingly, the entire apparatus can be made compact.

In addition, since the entire screen portion of the SLM 109 can be shielded from external light by the light blocking member 10 during image writing, it is possible to collectively write an image to the SLM 109, and it is also possible to realize a great reduction in writing time and a simpler mechanical construction for writing images.

(Second Embodiment)

Figure 11:
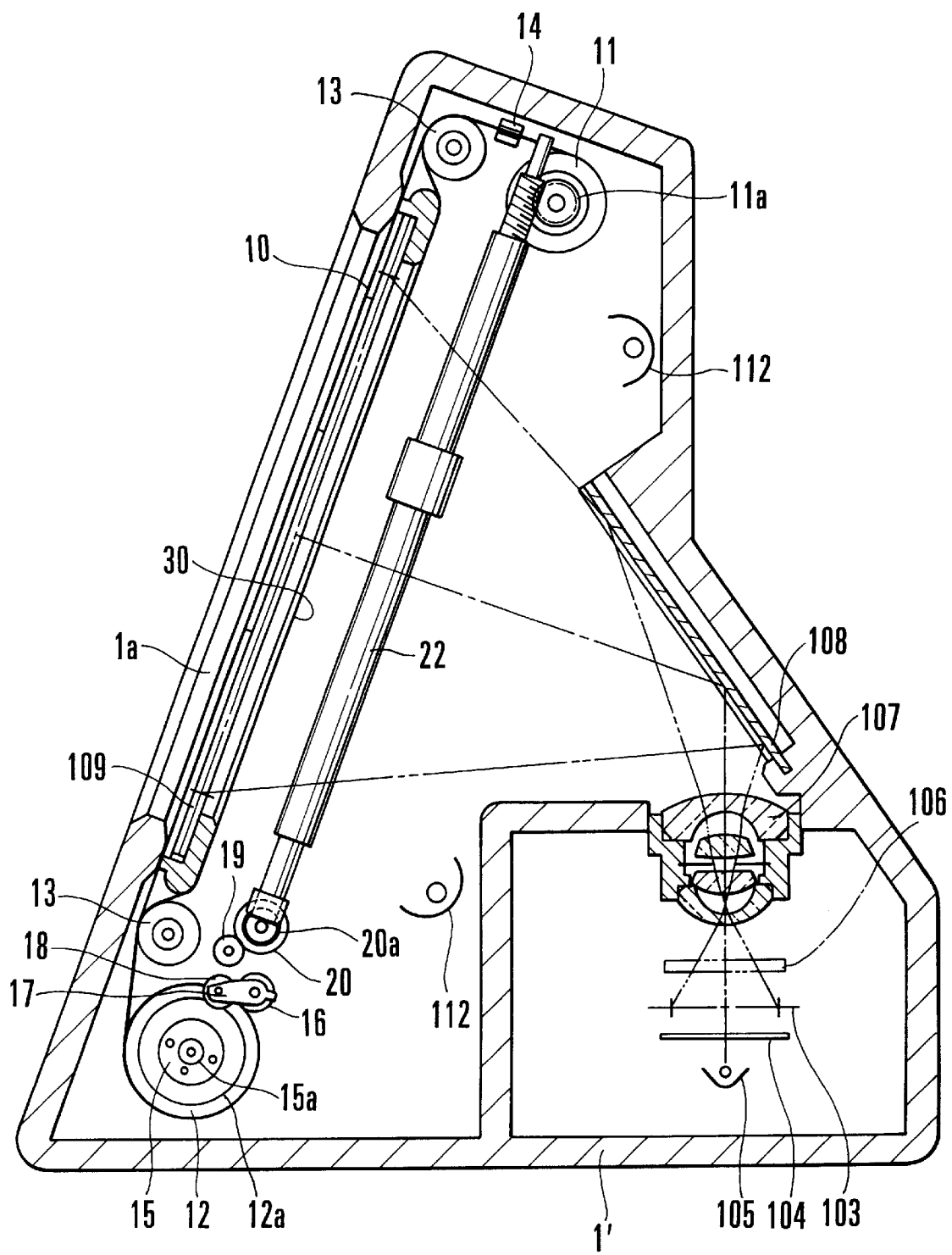
FIG. 11 is a diagrammatic cross-sectional view of an image display apparatus according to a second embodiment of the present invention.
Figure 13:
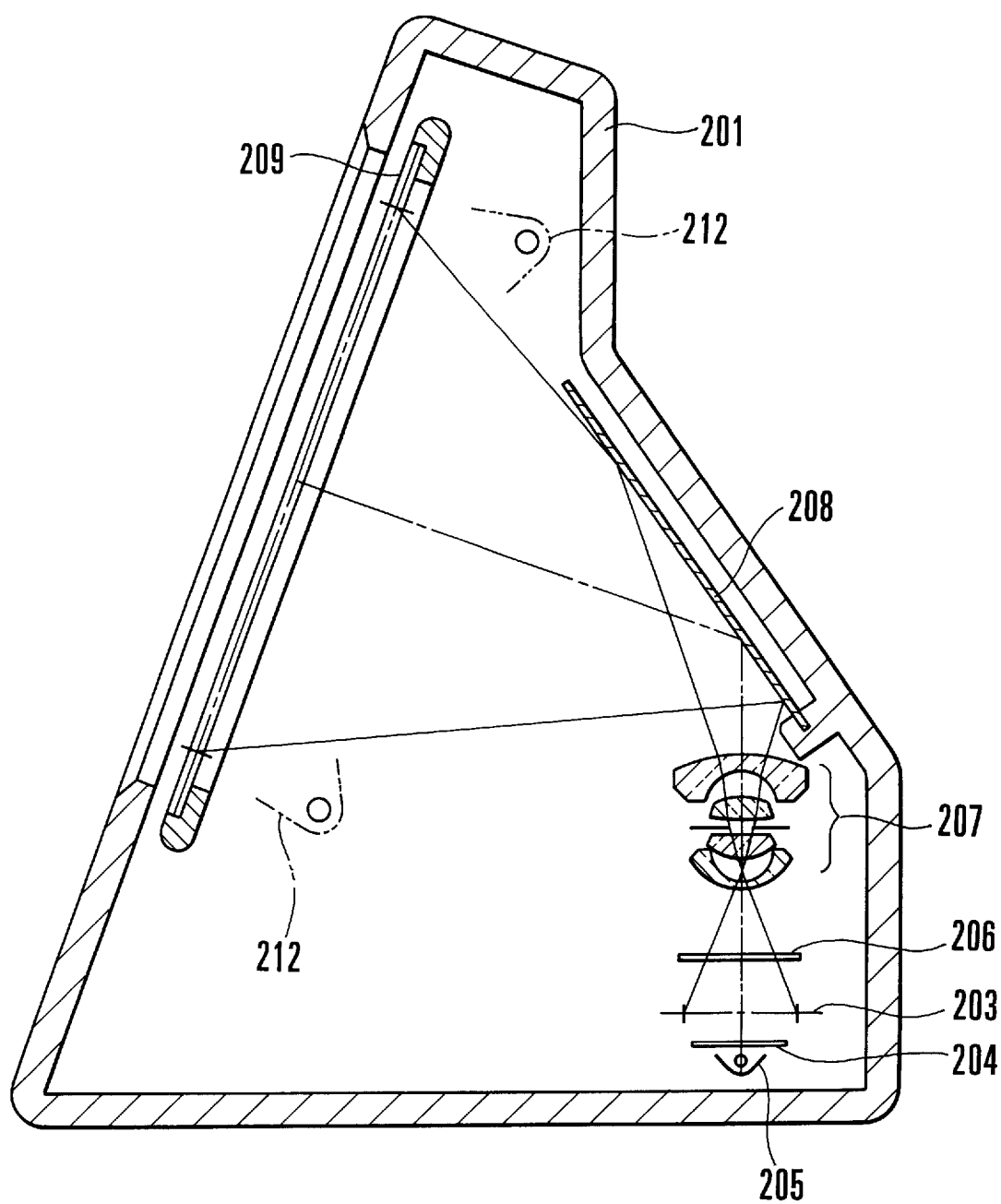
FIG. 13 is a diagrammatic cross-sectional view of a previously proposed image display apparatus.
Figure 14:
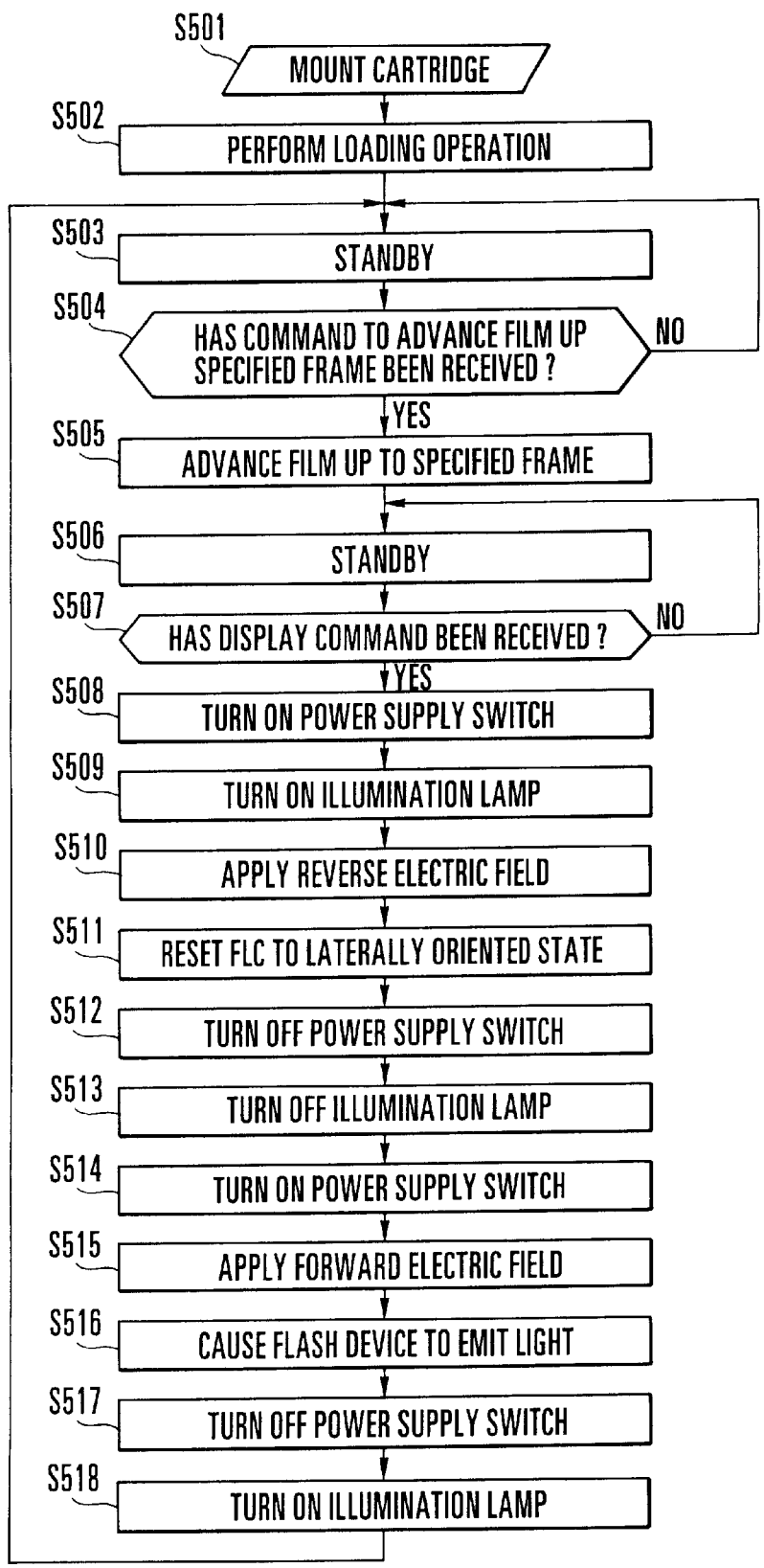
FIG. 14 is a flowchart of the operation of the image display apparatus shown in FIG. 13.
Figure 15:
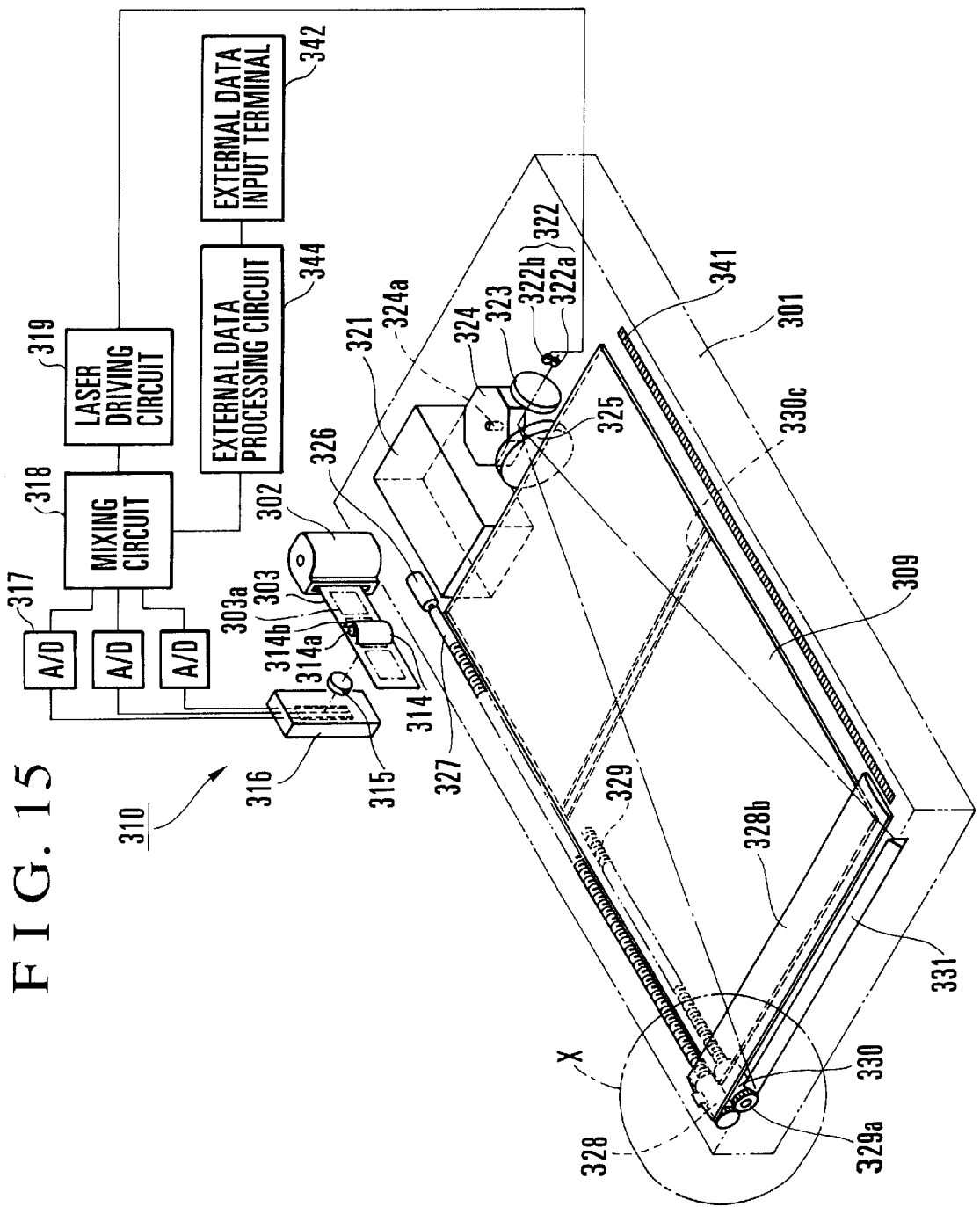
FIG. 15 is a diagrammatic perspective view of another previously proposed image display apparatus.
Figure 16:
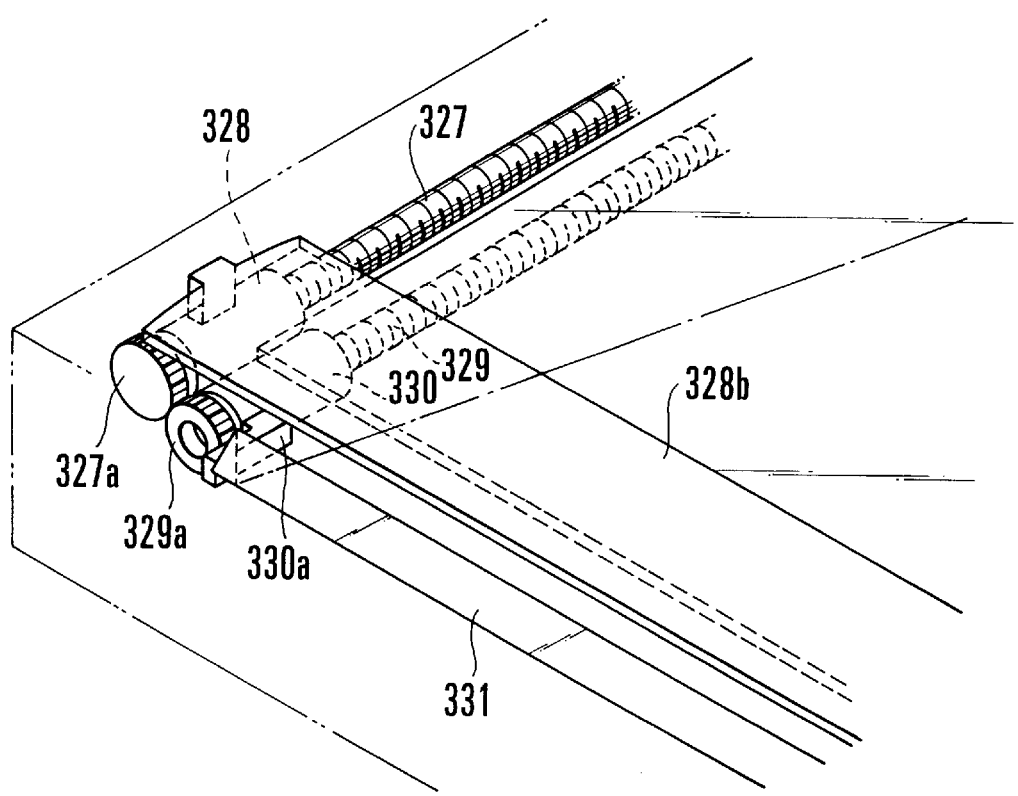
FIG. 16 is an enlarged view of a portion X of FIG. 15.
Figure 17:
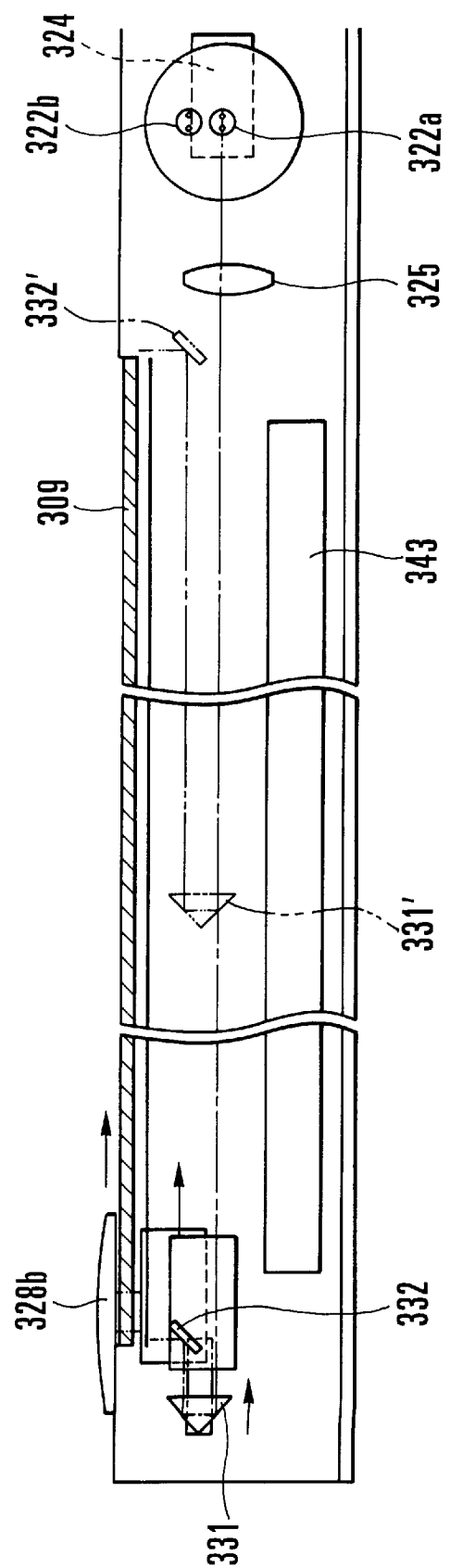
FIG. 17 is a partial diagrammatic cross-sectional view of the still image display shown in FIG. 15.

FIGS. 11, 12(a) and 12(b) show an image display apparatus 1' according to a second embodiment of the present invention. Since the basic construction of the second embodiment is identical to that of the first embodiment, identical reference numerals are used to denote constituent elements common to the first embodiment, and the description thereof is omitted.

Referring to FIG. 11, a strip sheet-like diffusion member 30 is disposed on the side of the back surface of the SLM 109. The diffusion member 30 can be transported in its longitudinal direction together with the light blocking member 10 by the rotational driving of the winding shafts 11 and 12 either of which winds the light blocking member 10 around itself. The guide shafts 13 which are respectively disposed in the vicinity of the winding shafts 11 and 12 give appropriate tension to the light blocking member 10 and the diffusion member 30 to impart flatness to them, and also serve as guides which allow the light blocking member 10 and the diffusion member 30 to be wound around the winding shaft 11 or 12.

As shown in FIG. 12(b), the diffusion member 30 has a light transmission portion 30A and a diffusion portion 30B which are formed in line in the longitudinal direction (the direction in which to transport the diffusion member 30). The light blocking portion 30A has an opening portion 30a formed to allow image light to be transmitted therethrough on as-projected basis and be made incident on the entire back surface of the screen portion of the SLM 109 during the writing of an image to the SLM 109, and the diffusion portion 30B serves to diffuse reading light from the reading illumination lamp 112 and illuminate the entire back surface of the screen portion of the SLM 109 with the diffused reading light. The opening portion 30a has shorter and longer sides whose lengths are determined to block the optical path of image light. The diffusion member 30 has notches 30c and 30b which are respectively formed in upper and lower portions of the light transmission portion 30A at one widthwise end thereof and which are slightly larger in longitudinal size than the corresponding notches 10c and 10b of the light blocking member 10. The diffusion member 30 is superposed on the light blocking member 10 between the winding shaft 11 and the adjacent guide shaft 13, and, during this state, the notches 10c and 10b are respectively positioned inside the notches 30c and 30b. Accordingly, the diffusion member 30 does not hinder the position detecting sensor 14 from detecting the notches 10c and 10b of the light blocking member 10.

When the notch 10c of the light blocking member 10 is detected by the position detecting sensor 14, the light blocking portion 10A of the light blocking member 10 is set to the light blocking position, and the opening portion 30a of the light transmission portion 30A of the diffusion member 30 is set to a position (light transmission position) which is superposed on the back surface of the screen portion of the SLM 109. When the notch 10b of the light blocking member 10 is detected by the position detecting sensor 14, the observation portion 10B of the light blocking member 10 is set to the observation position, and the diffusion portion 30B of the diffusion member 30 is set to a position (diffusion position) which is superposed on the back surface of the screen portion of the SLM 109.

In the image display apparatus 1' according to the second embodiment having the above-described construction, during erasure of an old image stored in the SLM 109 and writing of a new image to the SLM 109, the light blocking member 10 (the light blocking portion 10A) is set to the light blocking position, and the diffusion member 30 (the light transmission portion 30A) is set to the light transmission position. Accordingly, it is possible to project clear image light onto the back surface of the screen portion of the SLM 109 through the opening portion 30a in the state of blocking external light from the front surface of the SLM 109. During observation of the new image after writing, the light blocking member 10 (the observation portion 10B) is set to the light blocking position, and the diffusion member 30 (the diffusion portion 30B) is set to the observation position. Accordingly, it is possible to illuminate the back surface of the screen portion of the SLM 109 with reading light from the reading illumination lamp 112 in an approximately uniformly diffused state, so that the user can be allowed to observe an image of high quality with the SLM 109 being free from non-uniform illumination or with no image of the reading illumination lamp 112 itself being formed on the SLM 109.

As described above, in accordance with the second embodiment, it is possible to allow the user to observe the stored image of the SLM 109 with uniform backlight illumination by means of a simple construction without the need to substantially increase the entire size of the image display apparatus 1 according to the first embodiment.

Although the second embodiment has been described with reference to the case in which both the light blocking member 10 and the diffusion member 30 are provided, only the diffusion member 30 may be provided. In this case as well, it is possible to allow the user to observe the stored image of the SLM 109 with uniform backlight illumination by means of a simple construction without the need to substantially increase the entire size of the apparatus.

The construction of light blocking means or diffusion member means in the present invention and the construction of a mechanism for driving these means are not limited to only those referred to above in each of the descriptions of the first and second embodiments. For example, a motor may also be provided on the side of the winding shaft 11 so that the winding shafts 11 and 12 can be individually driven.

Although each of the first and second embodiments has been described with reference to an example in which an image recorded on a film drawn from a film cartridge is written to an SLM, the present invention can be applied to an apparatus which displays an image recorded on another type of original (transparent original).

Furthermore, although each of the first and second embodiments has been described with reference to a case in which a liquid crystal type of SLM is used as storage display means, the present invention can be applied to a spatial light modulation element of any type other than the liquid crystal type, for example, an image display apparatus which uses a spatial light modulation element using a BSO or another storage display means.

Although each of the first and second embodiments has been described with reference to a case in which a sheet-like member to be transported along the SLM is used as light blocking means or diffusion means, the present invention may also use a member other than such a sheet-like member, or an element such as a liquid crystal panel which is set to a light blocking state or a light diffusing state when voltage is applied, and is set to an observation-possible state or a light-transmitting state when the application of voltage is stopped.

As is apparent from the foregoing description, in accordance with the above-described embodiments, since it is possible to collectively write an image to the entire screen of the storage display means with the entire front surface of the screen portion of the SLM being shielded from external light, it is possible to realize a reduction in the size of a writing source or the like and a simpler mechanical structure for the storage display means, whereby it is possible to make the image display apparatus compact.

Furthermore, it is possible to display an image written to the storage display means, in the state of being illuminated with approximately uniform diffused light, whereby it is possible to display an image of high quality.

Incidentally, in the apparatus which is provided with both the light blocking means and the diffusion means, if one driving means is used as driving means for transporting the light blocking means and driving means for transporting the diffusion means, one driving mechanism suffices, and the apparatus can be made far more compact.

(Third Embodiment)

Figure 18:
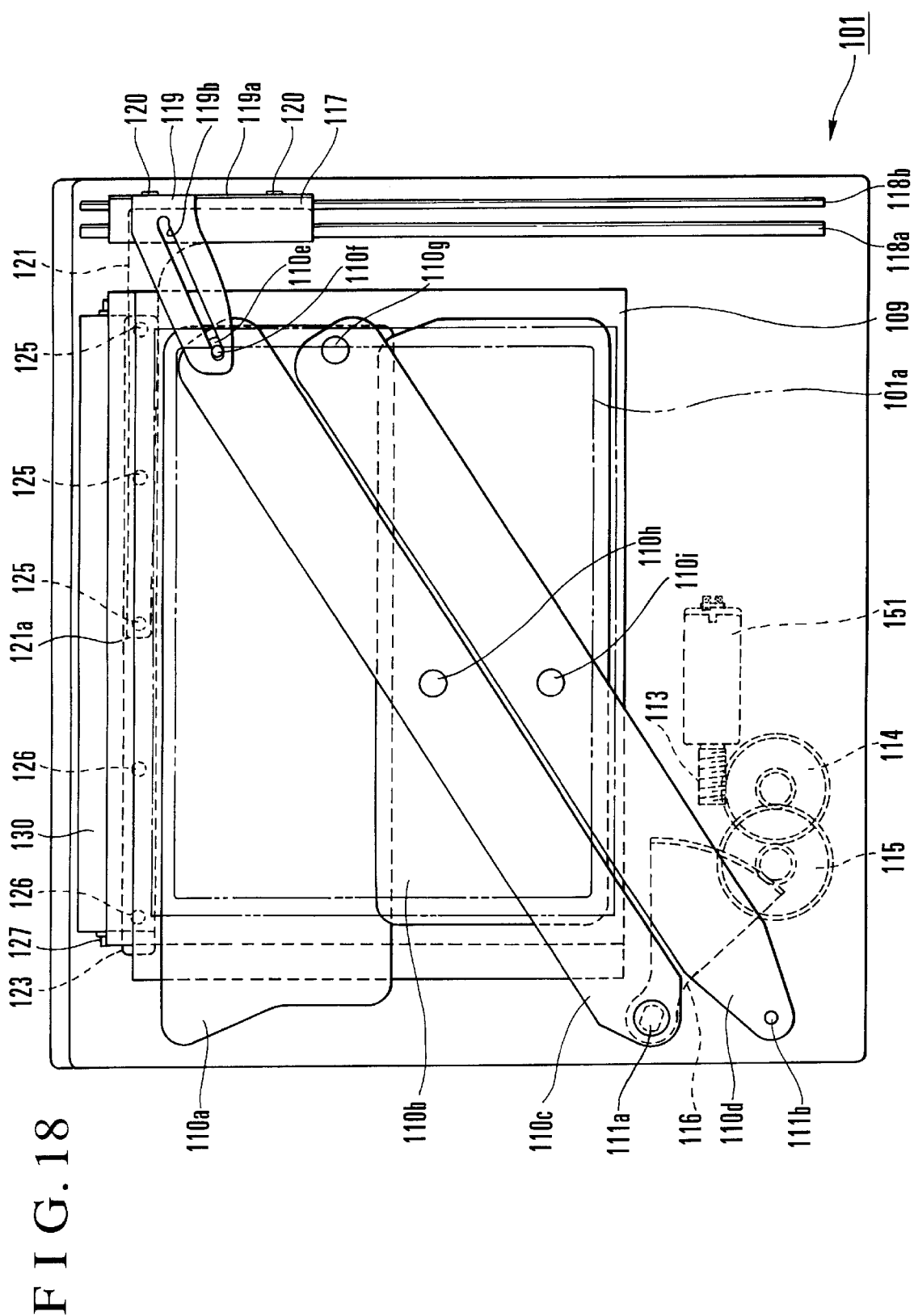
FIG. 18 is a view of essential portions, such as light blocking means, of an image display apparatus according to a third embodiment of the present invention as viewed from the front of the screen of the apparatus, and shows a light-blocked state for image writing.
Figure 19:
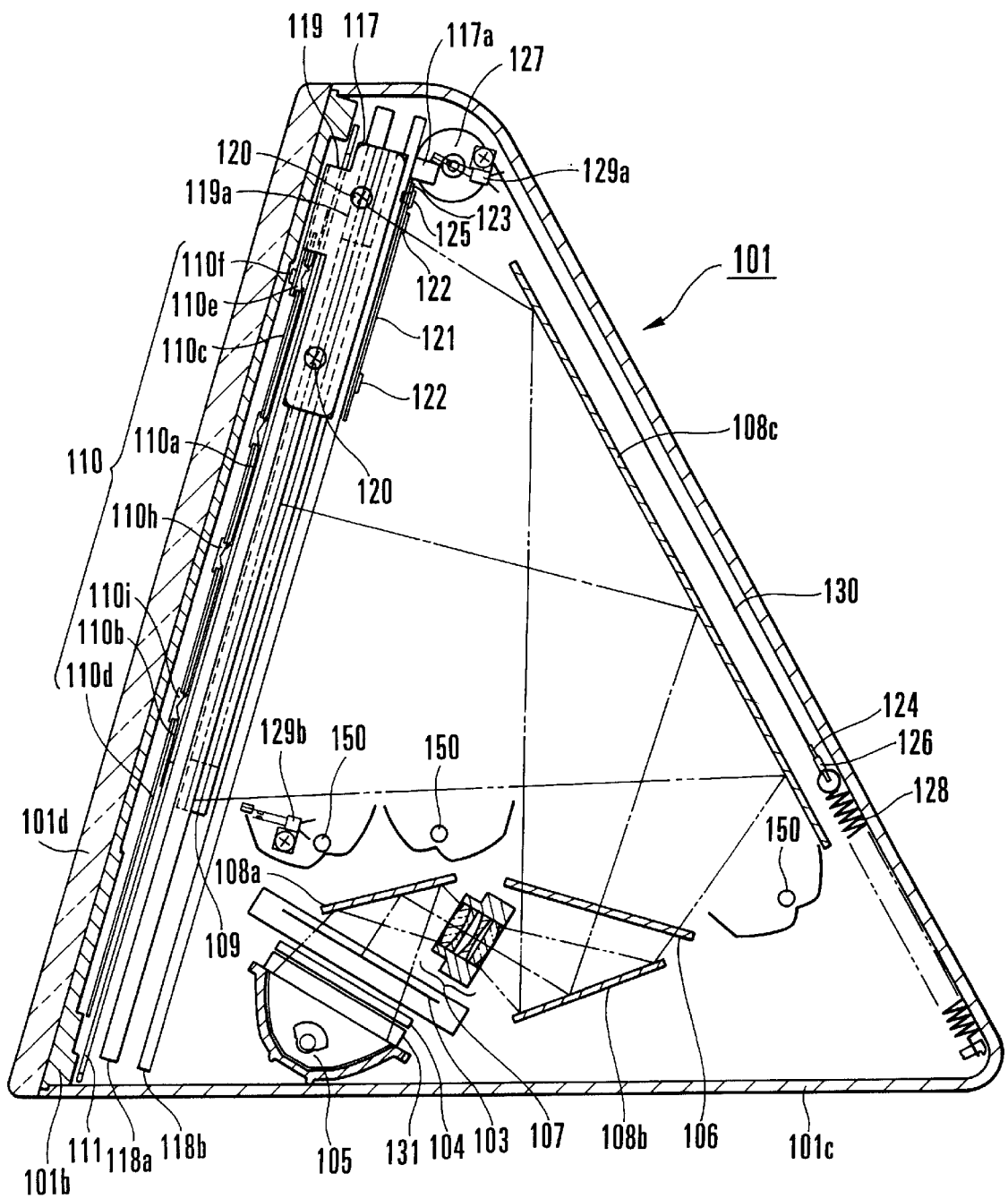
FIG. 19 is a longitudinal sectional view of the image display apparatus shown in FIG. 18 according to the third embodiment of the present invention.
Figure 20:
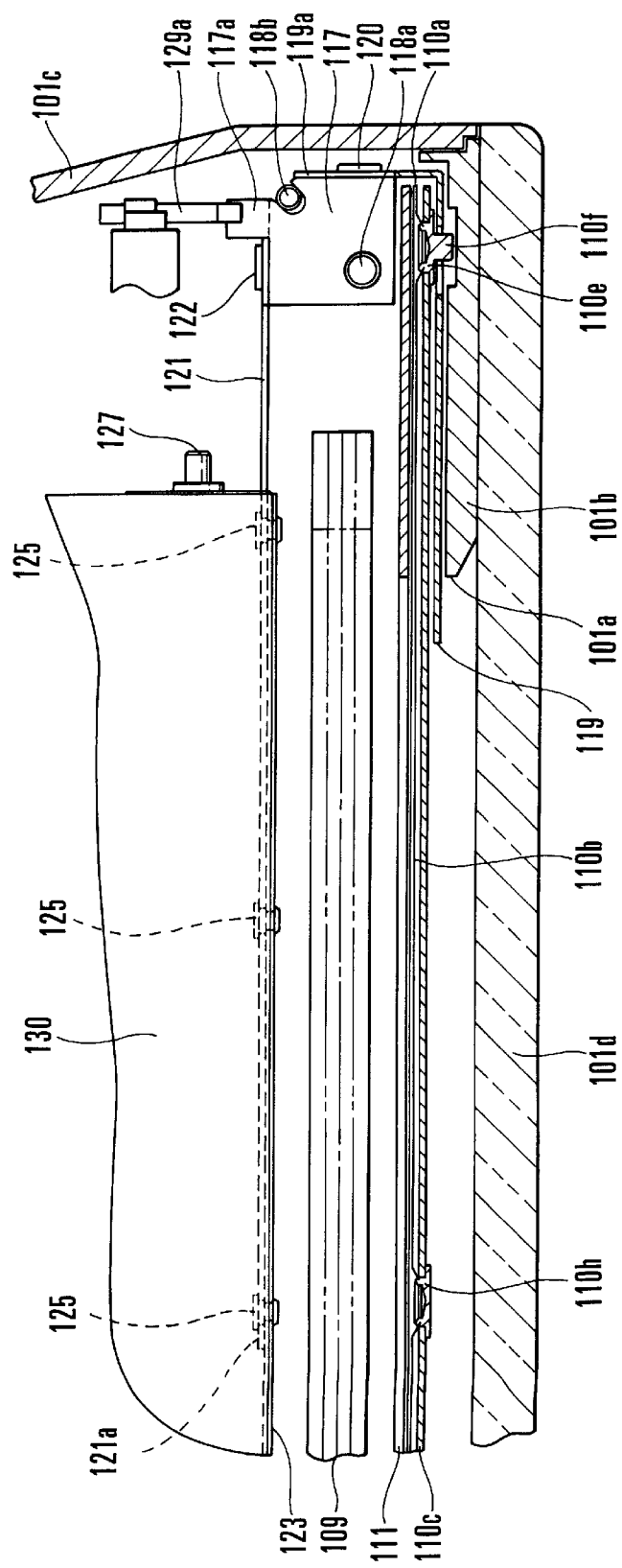
FIG. 20 is a view showing an essential portion, as viewed from above, which provides connection between light blocking means and diffusion means in the image display apparatus according to the third embodiment of the present invention.
Figure 21:
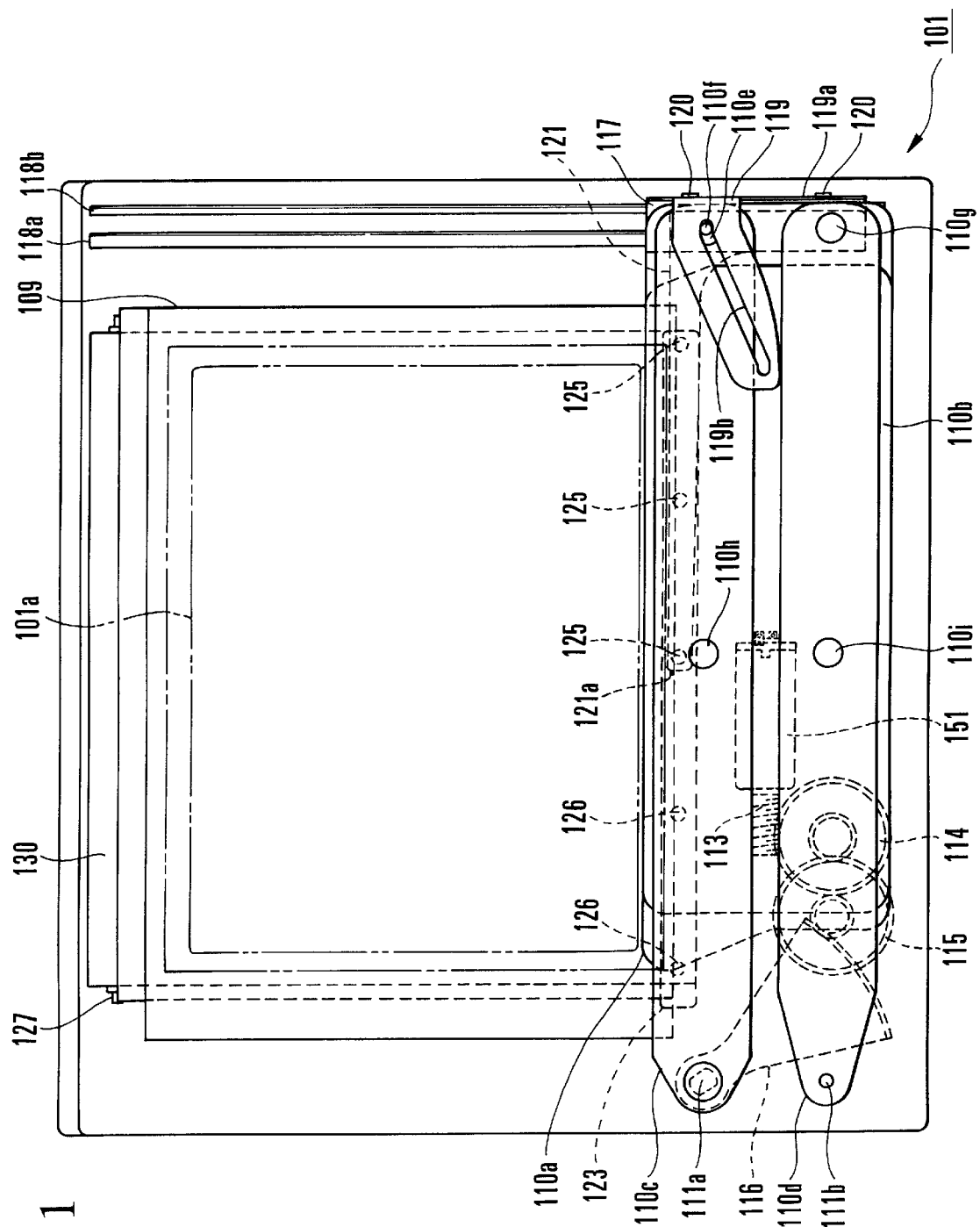
FIG. 21 is a view of the essential portions, such as the light blocking means, of the image display apparatus according to the third embodiment of the present invention as viewed from the front of the screen of the apparatus, and shows a light-unblocked state for image reading.
Figure 22:
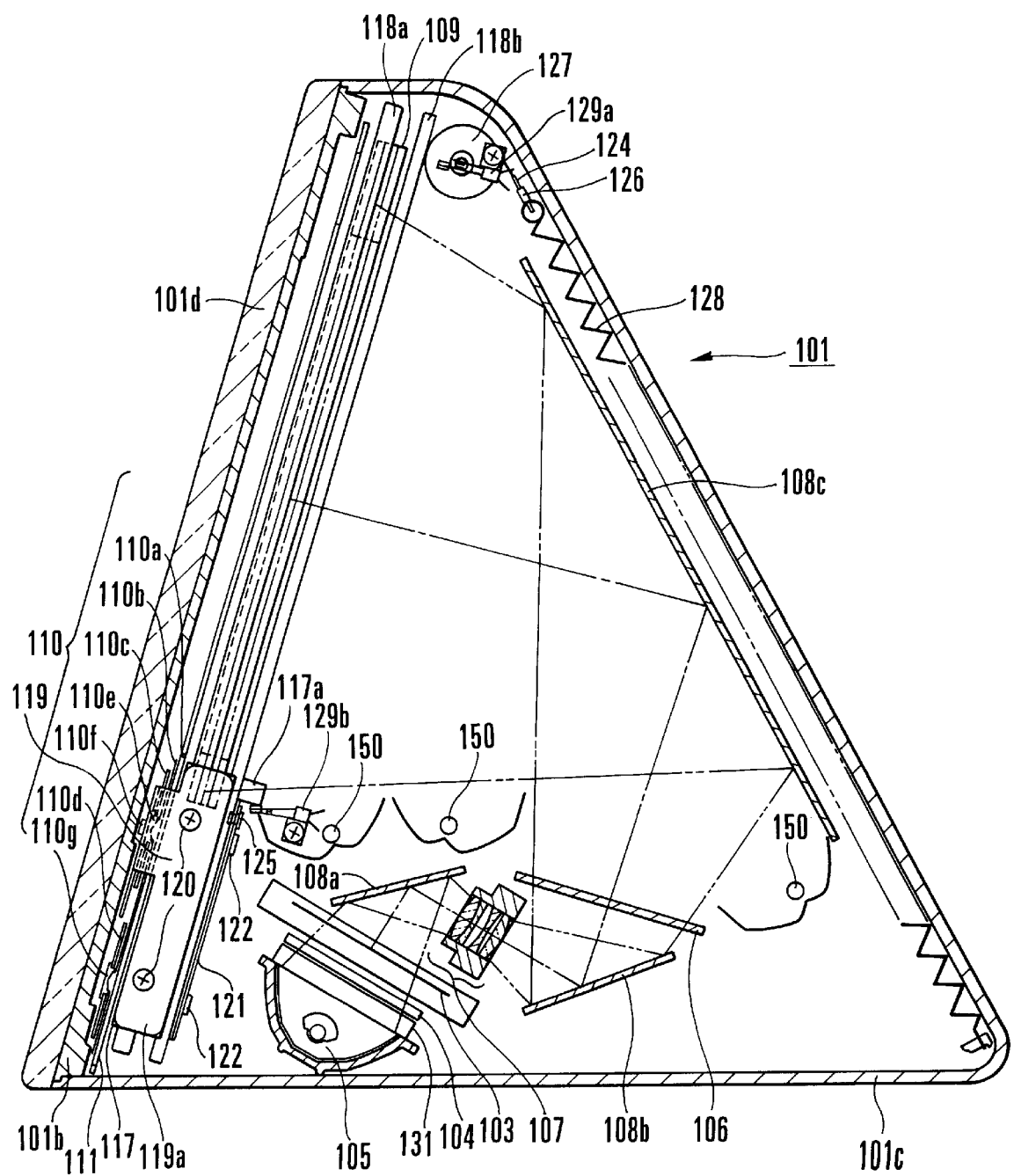
FIG. 22 is a longitudinal sectional view of the image display apparatus according to the third embodiment of the present invention shown in FIG. 21.
Figure 23:
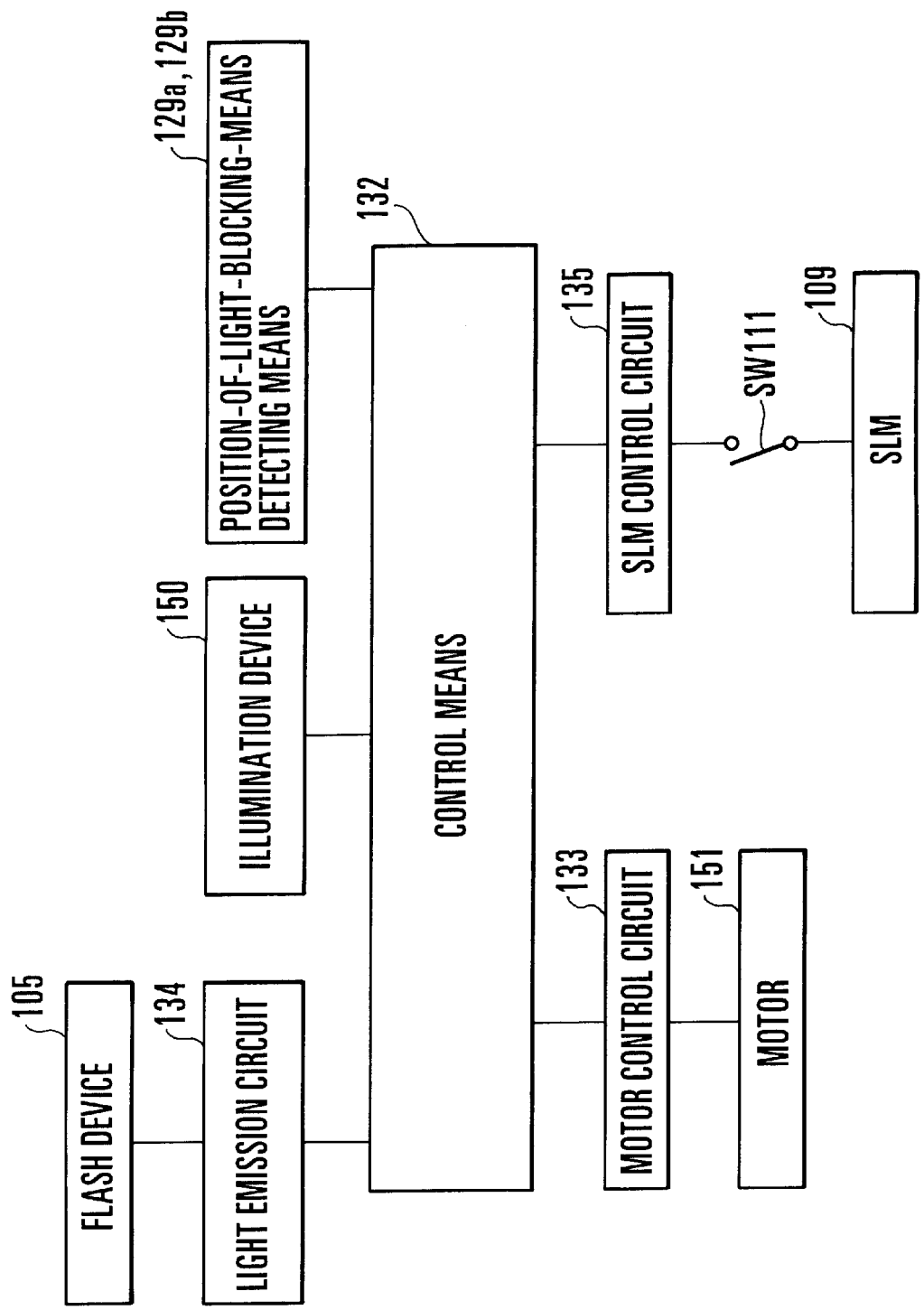
FIG. 23 is a block diagram of the electrical circuit of the image display apparatus according to the third embodiment of the present invention.
Figure 24:
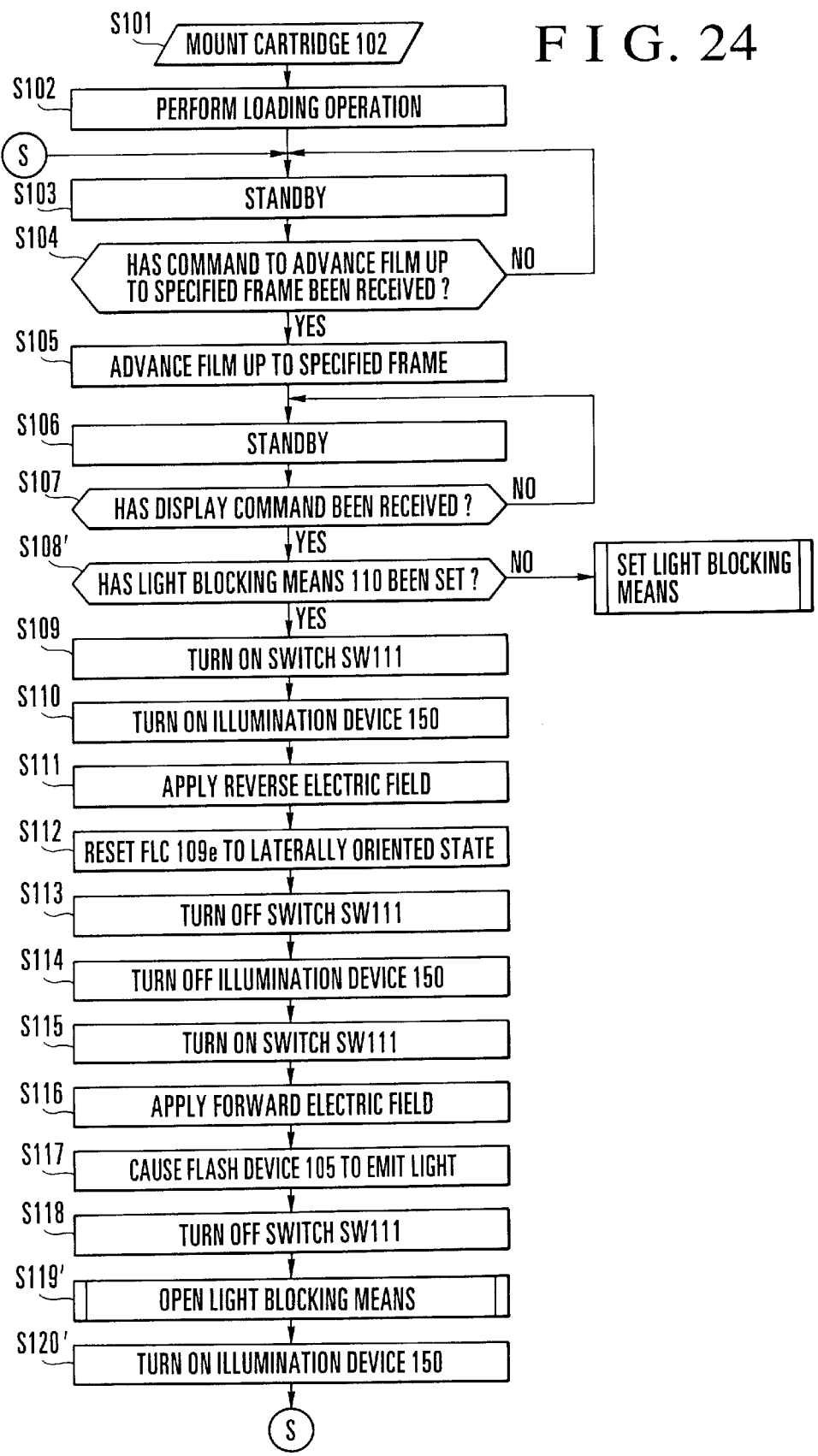
FIG. 24 is a flowchart of the operation of the image display apparatus according to the third embodiment of the present invention.
Figure 25:
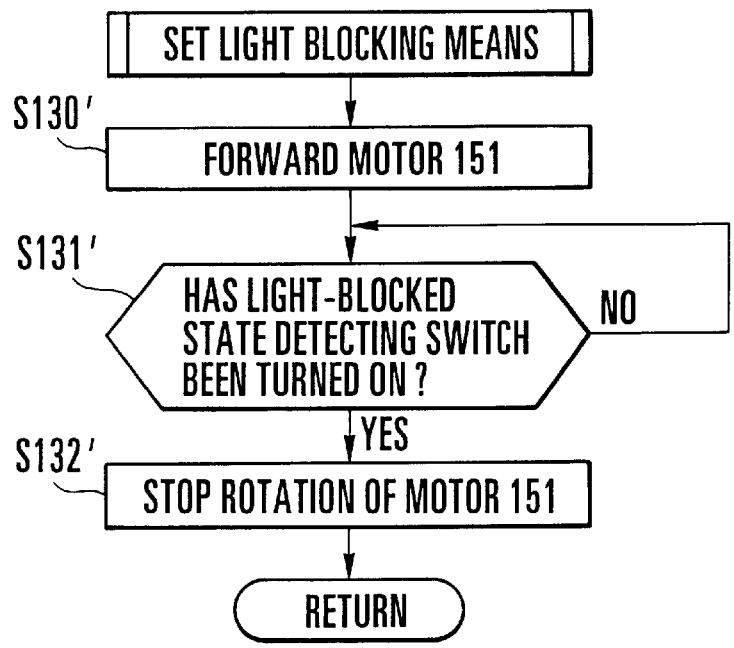
FIG. 25 shows a light-blocking-means setting subroutine incorporated in the flowchart of the operation of the image display apparatus according to the third embodiment of the present invention.
Figure 26:
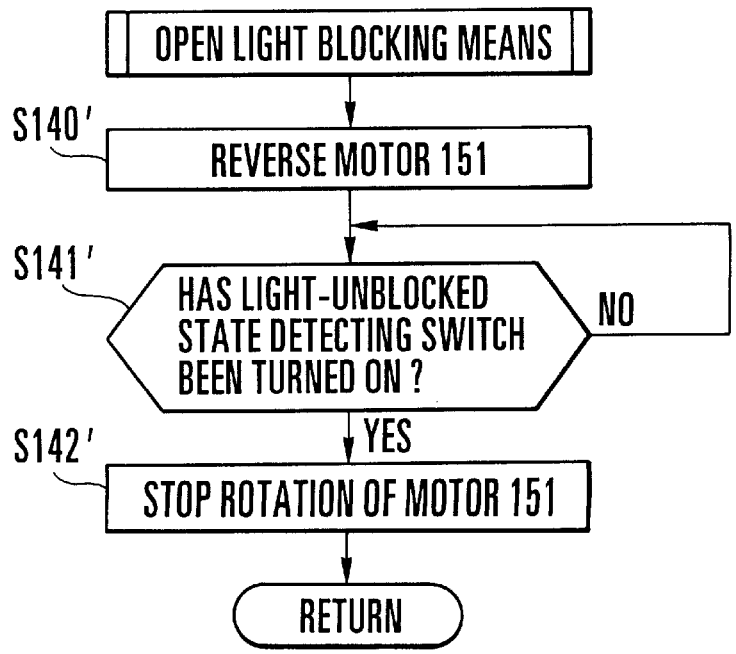
FIG. 26 shows a light-blocking-means opening subroutine incorporated in the flowchart of the operation of the image display apparatus according to the third embodiment of the present invention.

FIGS. 18 to 26 are views showing a third embodiment of the present invention. FIG. 18 is a view of essential portions, such as light blocking means, of an image display apparatus 101 as viewed from the front of the screen thereof, and shows a light-blocked state for image writing. FIG. 19 is a longitudinal sectional view of the image display apparatus 101 shown in FIG. 18. FIG. 20 is a view showing an essential portion which provides connection between the light blocking means and diffusion means as viewed from above. FIG. 21 is a view of the essential portions, such as the light blocking means, of the image display apparatus 101 as viewed from the front of the screen thereof, and shows a light-unblocked state for image reading. FIG. 22 is a longitudinal sectional view of the image display apparatus 101 shown in FIG. 21. FIG. 23 is a block diagram of the electrical circuit of the image display apparatus 101. FIGS. 24 to 26 are flowcharts of the operation of the image display apparatus 101.

As shown in FIGS. 18 to 22, the image display apparatus 101 includes a front cover 101b in which an image-observing opening portion (window) 101a is formed, a back cover 101c, and a transparent cover 101d which covers the whole of the front cover 101b, and these covers 101b, 101c and 101d are fixed to the body (not shown) of the image display apparatus 101. The image display apparatus 101 also includes light blocking means 110 (composed of constituent elements 110a to 110i) for preventing external light from entering from the image-observing opening portion 101a of the image display apparatus 101 during the writing of an image to the SLM 109, and the light blocking means 110 has a structure similar to the shutter-blade structure of a known blade type of shutter and includes parallel links formed by the light blocking blades 110a and 110b and the blade arms 110c and 110d. The respective blade arms 110c and 110d are rotatably fitted on fixed shafts 111a and 111b provided on a blade base plate 111 (which is fixed to the body (not shown)). The light blocking blade 110a is supported in the state of being integrally fastened to the dowels 110e and 110g, and the light blocking blade 110b is supported in the state of being integrally fastened to the dowels 110h and 110i. A motor 151 is fixed to the blade base plate 111, and has a worm gear 113 along its rotating shaft. The driving force of the motor 151 is transmitted to a sector gear 116 in such a manner that the rotating speed of the motor 151 is reduced by a helical double gear 114 and a double gear 115 which are rotatably supported on the blade base plate 111. The sector gear 116 is integrally connected to the blade arm 110c for rotation about the fixed shaft 111a. Accordingly, the light blocking blades 110a and 10b which constitute part of the light blocking means 110 are moved between a light-blocked state and a light-unblocked state by parallel link motion by the forward or reverse rotation of the motor 151. A slider 117 is vertically smoothly movably guided by guide shafts 118a and 118b each of which is supported on the body (not shown) at its opposite ends. A connecting cam plate 119 is fixed at its base portion 119a to one side of the slider 117 by a screw 120 and a cam portion 119b of the connecting cam plate 119 is engaged with a projecting pin 110f of the dowel 110e so that the motion of the light blocking means 110 is transmitted to the slider 117. A connecting plate 121 is fixed to the back side of the slider 117 by a screw 122, and is connected to diffusion means 130 via an elongated arm portion 121a. The diffusion means 130 serves to diffuse the illumination light of an illumination device 150 before it reaches the SLM 109, and approximately uniformly illuminate the SLM 109 with the diffused illumination light. The diffusion means 130 is made of a synthetic resin sheet material which shows diffusion characteristics with respect to transmitted light, and is readily drivably reinforced at its opposite ends by bases 123 and 124. A space which accommodates the diffusion means 130 is formed in the planar space between the back surface of a reflecting mirror 108c and the back cover 101c. The arm portion 121a of the connecting plate 121 and the diffusion means 130 are connected together by fastening pins 125 which are fixed by being inserted through and fastened to holes provided in the arm portion 121a and the base 123. The bases 123 and 124 are fixed to the synthetic resin sheet material having diffusion characteristics by fastening pins 126. A guide roller 127 serves to change the direction of the diffusion means 130 according to the shape of the image display apparatus, and is rotatably supported on the body (not shown) and is maximized in diameter so that the diffusion means 130 is prevented from remaining permanently bent, as effectively as possible. A tension coil spring 128 is hooked on the base 124 at one end and on the body (not shown) at the other end to apply tension to the sheet material of the diffusion means 130 so that the sheet material is prevented from being deflected. A light-blocked state detecting switch 129a is fixed to the body (not shown) as position-of-light-blocking-means detecting means, and when the light blocking means 110 is in the light-blocked state, the slider 117 is moved up and its operating projection 117a presses the switch contact of the light-blocked state detecting switch 129a so that the light-blocked state detecting switch 129a is switched from off to on to detect that the light blocking means 110 is in the light-blocked state. A light-unblocked state detecting switch 129b is fixed to the body (not shown) as position-of-light-blocking-means detecting means, and when the light blocking means 110 is in the light-unblocked state, the slider 117 is moved down and its operating projection 117a presses the switch contact of the light-unblocked state detecting switch 129b so that the light-unblocked state detecting switch 129b is switched from off to on to detect that the light blocking means 110 is in the light-unblocked state. An infrared-ray absorbing filter 131 absorbs infrared rays due to the flash emission of the flash device 105 which serves as an image writing light source, and mitigates the transmission of heat to a film 103.

FIG. 23 is a block diagram of the electrical circuit of the image display apparatus 101. The electrical circuit shown in FIG. 23 includes control means 132 which is responsible for the entire control sequence of the image display apparatus 101, a motor control circuit 133 for controlling the motor 151 to forward or reverse it, a light emission circuit 134 for controlling the light emission of the flash device 105, and an SLM control circuit 135 for controlling the switch SW111 which switches on or off the supply of electric power to the SLM 109.

The operation of the light blocking means 110 in the image display apparatus 101 will be described below with reference to the flowchart shown in FIG. 24. The flowchart starts when the film cartridge 102 is mounted in the image display apparatus 101 according to the third embodiment, and, at this time, the light blocking means 110 is in the light-blocked state of covering the opening portion 101a of the image display apparatus 101, i.e., in a state which does not allow the user to observe an image stored on the SLM 109.

As stated previously in detail in the description of the operation of the first embodiment, when the user mounts the film cartridge 102 in the image display apparatus 101 in order to view an image recorded on the film accommodated in the film cartridge 102 by means of the image display apparatus 101 (S101), the image display apparatus 101 performs a loading operation and enters a standby mode (S102 and S103). After the image display apparatus 101 has received a command to advance the film up to a frame specified by the user and has performed a specified-frame positioning operation (S105), the image display apparatus 101 enters a standby mode for waiting for a command to display the image of the specified frame (S106).

In this state, if the image display apparatus 101 receives a display command from the user (S107), the control means 132 checks whether the position-of-light-blocking-means detecting means 129a has been switched from off to on and the light blocking means 110 has been brought into the light-blocked state. In other words, the control means 132 checks whether the light blocking means 110 has been set to the state of completely covering the opening portion 101a of the image display apparatus 101, so that an operation which will be described below (erasure of a previously displayed frame image and writing of a new image) can be carried out with the light blocking means 110 being set to such state (S108'). If the light blocking means 110 does not completely cover the opening portion 101a of the image display apparatus 101, the process proceeds to a light-blocking-means setting subroutine which will be described later.

After the control means 132 has checked the position of the light blocking means 110, the control means 132 performs the operation of erasing the displayed image of the previous frame and writing a new image and turns off the switch SW111 (S109 to S118), as stated previously in detail in the description of the first embodiment. After that, in order that the user can observe the image stored in the SLM 109, the process proceeds to a light-blocking-means opening subroutine (to be described later) for causing the light blocking means 110 to bring the opening portion 101a of the image display apparatus 101 into the light-unblocked state (S119'). Then, the control means 132 turns on the illumination device 150 so that the user can view the image stored in the SLM 209, by means of transmitted illumination (S120'). After that, the image display apparatus 101 enters the standby mode for waiting for the next command (S103).

The light-blocking-means setting subroutine and the light-blocking-means opening subroutine will be described below.

First, the light-blocking-means setting subroutine will be described with reference to the flowchart of FIG. 25.

First of all, the motor 151 is forwarded in order to cause the light blocking means 110 to completely block light passing through the opening portion 101a of the image display apparatus 101 (S130'). Then, with the rotation of the worm gear 113 of the motor 151, the helical double gear 114 rotates counterclockwise, and as the double gear 115 rotates clockwise at a speed slower than the speed of rotation of the helical double gear 114, the sector gear 116 rotates counterclockwise. Accordingly, the blade arm 110c rotates about the fixed shaft 111a in the counterclockwise direction, and the light blocking means 110 moves from the light-unblocked state shown in FIGS. 21 and 22 to the light-blocked state shown in FIGS. 18 and 19. During this time, the slider 117 which interlocks with the light blocking means 110 moves upward and the diffusion means 130 uncovers the SLM 109 so that an image can be written to the SLM 109, and when the light blocking means 110 completely blocks light passing through the opening portion 101a of the image display apparatus 101, the operating projection 117a of the slider 117 presses the switch contact of the light-blocked state detecting switch 129a at nearly the same timing, and the light-blocked state detecting switch 129a is switched from off to on. Thus, the control means 132 detects that the light blocking means 110 has completely blocked light passing through the opening portion 101a of the image display apparatus 101 (S131'), and a signal for stopping the rotation of the motor 151 is outputted from the control means 132 to the motor control circuit 133 so that the rotation of the motor 151 is stopped (S132').

Thus, the light-blocking-means setting subroutine comes to an end.

The light-blocking-means opening subroutine will be described with reference to the flowchart of FIG. 26.

First of all, the motor 151 is reversed in order to cause the light blocking means 110 to completely unblock light passing through the opening portion 101a of the image display apparatus 101 (S140'). Then, with the rotation of the worm gear 113 of the motor 151, the helical double gear 114 rotates clockwise, and as the double gear 115 rotates counterclockwise at a speed slower than the speed of rotation of the helical double gear 114, the sector gear 116 rotates clockwise. Accordingly, the blade arm 110c rotates about the fixed shaft 111a in the clockwise direction, and the light blocking means 110 moves from the light-blocked state shown in FIGS. 18 and 19 to the light-unblocked state shown in FIGS. 21 and 22. During this time, the slider 117 which interlocks with the light blocking means 110 moves downward and the diffusion means 130 which has been in the state of uncovering the SLM 109 covers the SLM 109 and diffuses the illumination light of the illumination device 150 to approximately uniformly illuminate the SLM 109 with the diffused illumination light. When the light blocking means 110 completely unblocks light passing through the opening portion 101a of the image display apparatus 101, the operating projection 117a of the slider 117 presses the switch contact of the light-unblocked state detecting switch 129b at nearly the same timing, and the light-unblocked state detecting switch 129b is switched from off to on. Thus, the control means 132 detects that the light blocking means 110 has completely unblocked light passing through the opening portion 101a of the image display apparatus 101 (S141'), and a signal for stopping the rotation of the motor 151 is outputted from the control means 132 to the motor control circuit 133 so that the rotation of the motor 151 is stopped (S142').

Thus, the light-blocking-means opening subroutine comes to an end.

As described above, the light blocking means 110 is constructed as a parallel link structure which moves in only a plane, while the diffusion means 130 is constructed as a structure which moves a synthetic resin sheet material in a substantially expanded state. Accordingly, the driving loads of both means 110 and 130 can be reduced so that the driving speeds of both means 110 and 130 can be increased to quickly switch over an image writing state and an image reading state. Furthermore, since the diffusion means 130 is driven by a simple arrangement via the light blocking means 110, both the light blocking means 110 and the diffusion means 130 can be smoothly reciprocally driven. Accordingly, it is possible to provide an image display apparatus of high quality and good operability.

In addition, by efficiently utilizing the planar space between the back surface of the reflecting mirror 108c having a large area and the back cover 101c which serves as an external appearance member, it is possible to accommodate the diffusion means 130 in a substantially expanded state in a portion directly adjacent to an external appearance member without being covered with an extra member, thereby making it possible to greatly reduce the entire size of the image display apparatus.

(Fourth Embodiment)

Figure 27:
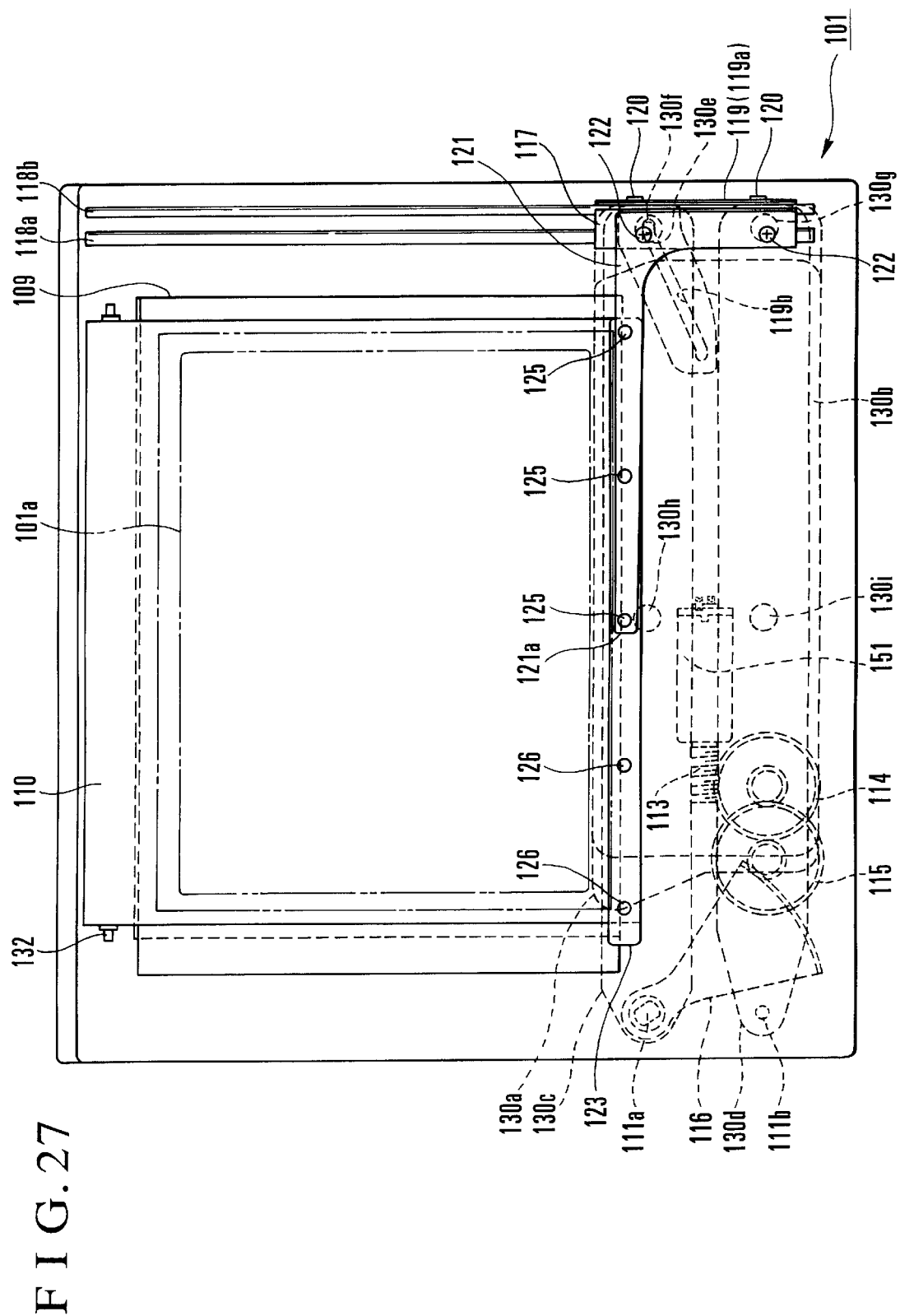
FIG. 27 is a view of essential portions, such as light blocking means, of an image display apparatus according to a fourth embodiment of the present invention as viewed from the front of the screen of the apparatus, and shows a light-blocked state for image writing.
Figure 28:
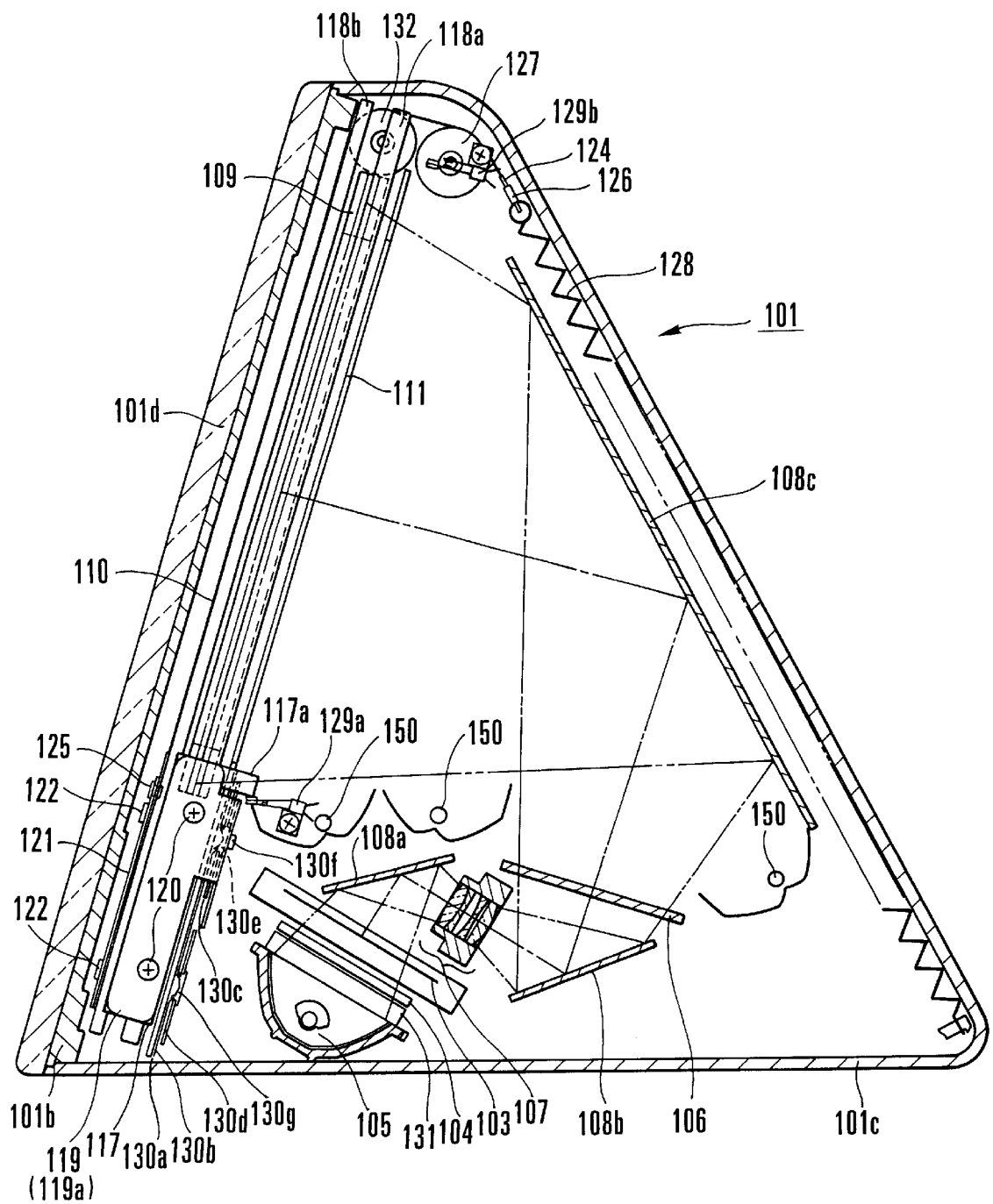
FIG. 28 is a longitudinal sectional view of the image display apparatus according to the fourth embodiment of the present invention shown in FIG. 27.
Figure 29:
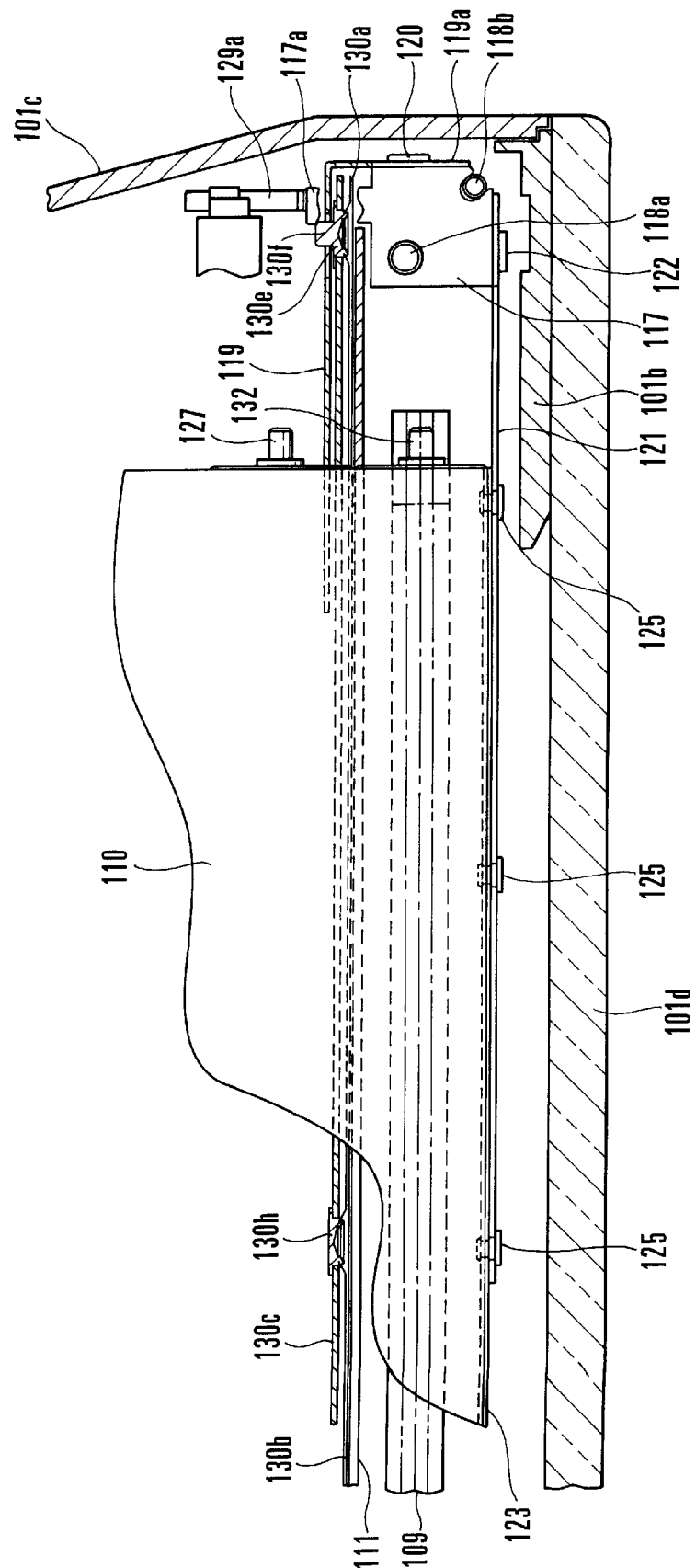
FIG. 29 is a view showing an essential portion, as viewed from above, which provides connection between light blocking means and diffusion means in the image display apparatus according to the fourth embodiment of the present invention.
Figure 30:
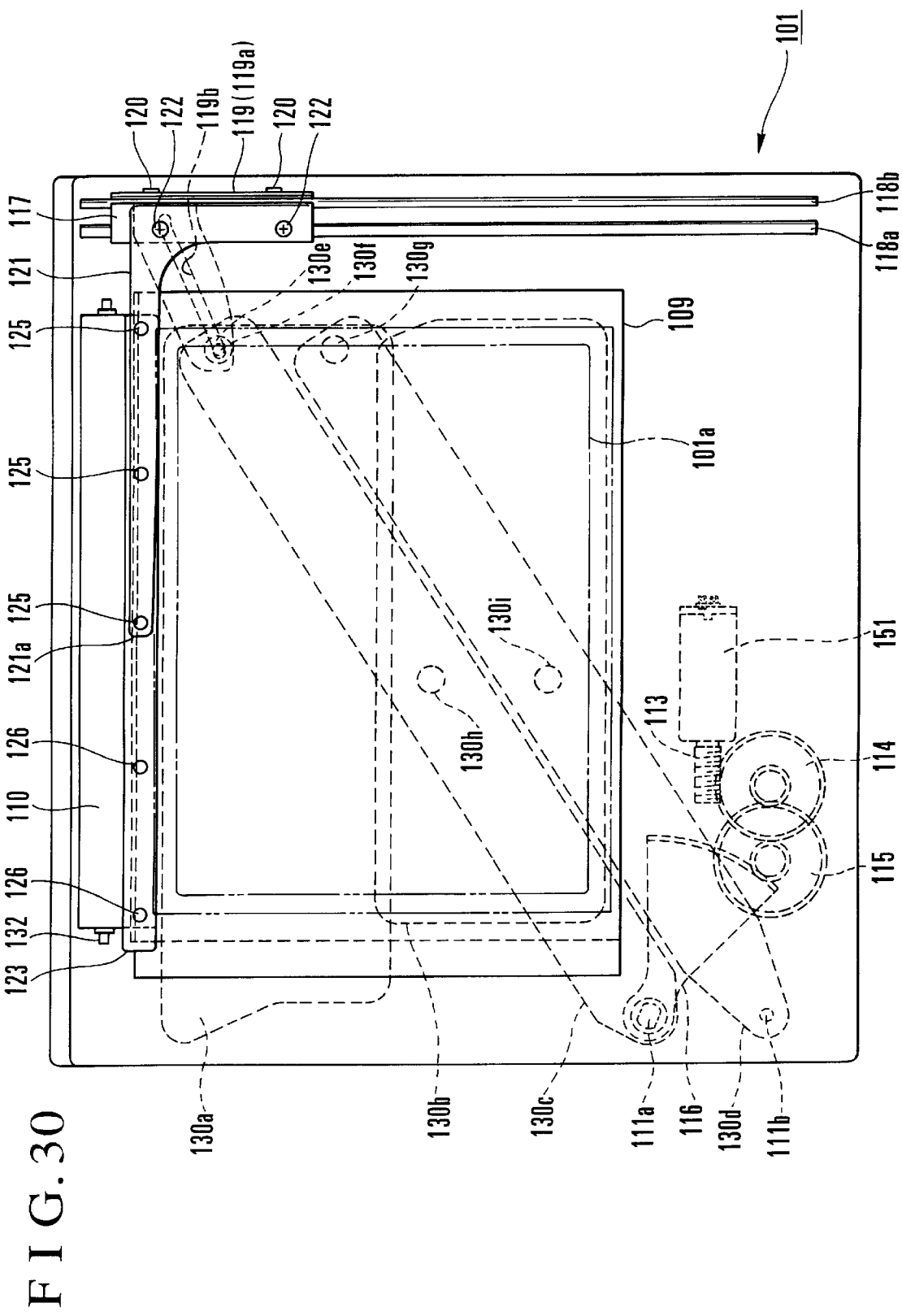
FIG. 30 is a view of the essential portions, such as the light blocking means, of the image display apparatus according to the fourth embodiment of the present invention as viewed from the front of the screen of the apparatus, and shows a light-unblocked state for image reading.
Figure 31:
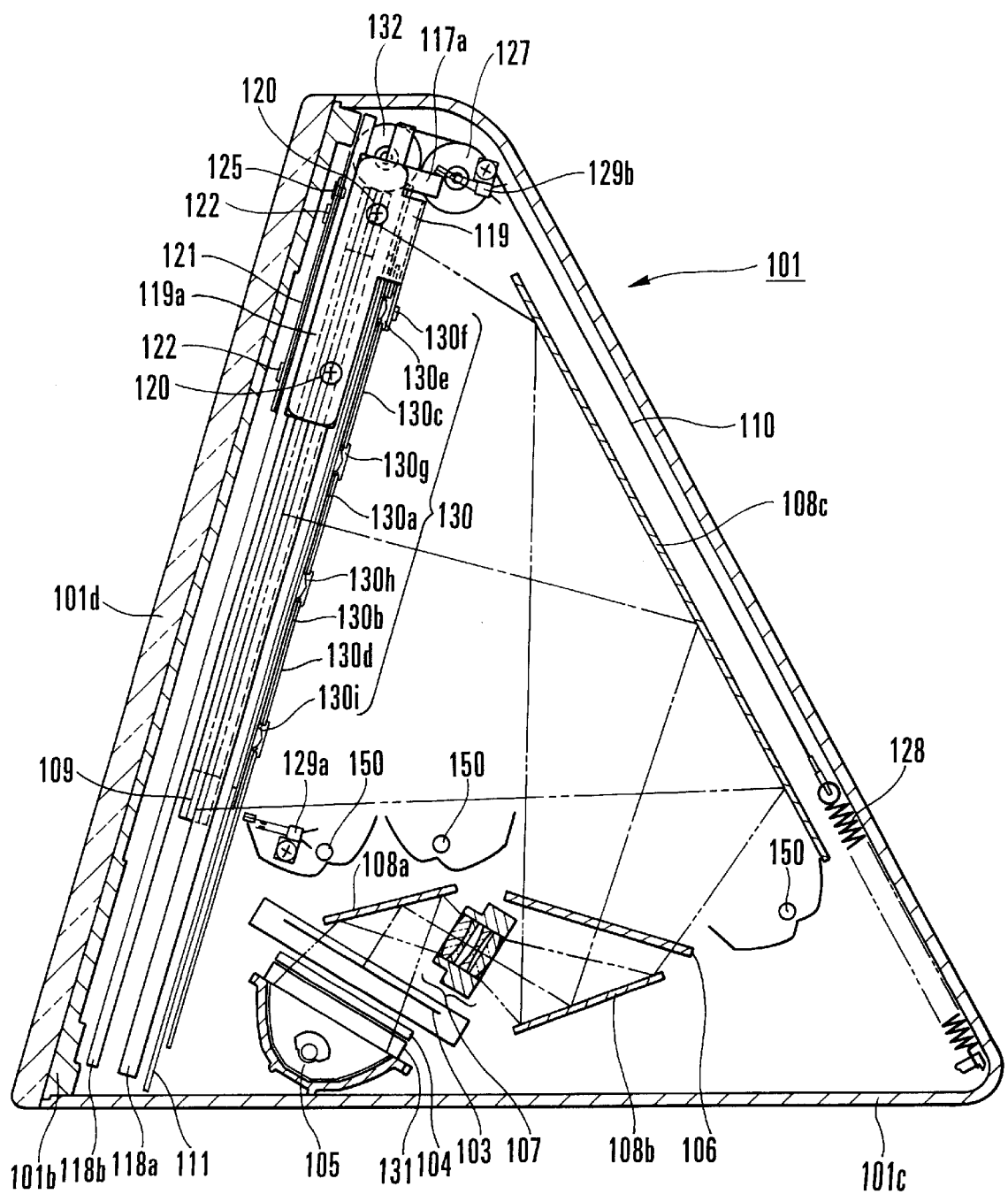
FIG. 31 is a longitudinal sectional view of the image display apparatus according to the fourth embodiment of the present invention shown in FIG. 30.

FIGS. 27 to 31 are views showing a fourth embodiment of the present invention. FIG. 27 is a view of essential portions, such as light blocking means, of the image display apparatus 101 as viewed from the front of the screen thereof, and shows a light-blocked state for image writing. FIG. 28 is a longitudinal sectional view of the image display apparatus 101 shown in FIG. 27. FIG. 29 is a view showing an essential portion which provides connection between the light blocking means and diffusion means as viewed from above. FIG. 30 is a view of the essential portions, such as the light blocking means, of the image display apparatus 101 as viewed from the front of the screen thereof, and shows a light-unblocked state for image reading. FIG. 31 is a longitudinal sectional view of the image display apparatus 101 shown in FIG. 30. The block diagram and the flowcharts of the fourth embodiment are similar to those shown in FIGS. 23 and 24 to 26.

The fourth embodiment is opposite to the third embodiment in the positional relationship between the light blocking means and the diffusion means.

AS shown in FIGS. 27 to 31, diffusion means 130 (composed of constituent elements 130a to 130i) serves to diffuse the illumination light of the illumination device 150 before it reaches the SLM 109, and approximately uniformly illuminate the SLM 109 with the diffused illumination light. All the constituent elements of the diffusion means 130 are made of a synthetic resin material which shows diffusion characteristics with respect to transmitted light, and the diffusion means 130 has a structure similar to the shutter-blade structure of a known blade type of shutter and includes parallel links formed by the diffusion blades 130a and 130b and the diffusion blade arms 130c and 130d. The respective diffusion blade arms 130c and 130d are rotatably fitted on the fixed shafts 111a and 111b provided on the blade base plate 111 (which is fixed to the body (not shown)). The diffusion blade 130a is supported in the state of being integrally fastened to the dowels 130e and 130g, while the diffusion blade 130b is supported in the state of being integrally fastened to the dowels 130h and 130i, so that both blades 130a and 130b can make a parallel link motion. Although some of the constituent elements 130a to 130i of the diffusion means 130 overlap each other during the image reading shown in FIGS. 30 and 31, the transmission and diffusion characteristics of the constituent elements which overlap each other are appropriately selected so that the SLM 109 is approximately uniformly illuminated with the diffused illumination light with the constituent elements 130a to 130i overlapping each other. The motor 151 is fixed to the blade base plate 111, and has the worm gear 113 along its rotating shaft. The driving force of the motor 151 is transmitted to the sector gear 116 in such a manner that the rotating speed of the motor 151 is reduced by the helical double gear 114 and the double gear 115 which are rotatably supported on the blade base plate 111. The sector gear 116 is integrally connected to the blade arm 130c for rotation about the fixed shaft 111a. Accordingly, the diffusion means 130 is moved between a light-transmitting state and a light-diffusing state by the forward or reverse rotation of the motor 151. The slider 117 is vertically smoothly movably guided by the guide shafts 118a and 118b each of which is supported on the body (not shown) at its opposite ends. The connecting cam plate 119 (which shows diffusion characteristics with respect to transmitted light) is fixed at the base portion 119a to one side of the slider 117 by the screw 120 and the cam portion 119b of the connecting cam plate 119 is engaged with the projecting pin 130f of the dowel 130e so that the motion of the light blocking means 130 is transmitted to the slider 117. The connecting plate 121 is fixed to the front side of the slider 117 by the screw 122, and is connected to the light blocking means 110 via the elongated arm portion 121a. The light blocking means 110 serves to prevent external light from entering from the image-observing opening portion 101a of the image display apparatus 101 during the writing of an image to the SLM 109, and the light blocking means 110 is made of a synthetic resin sheet material having light blocking characteristics, and is readily drivably reinforced at its opposite ends by the bases 123 and 124. A space which accommodates the light blocking means 110 is formed in the planar space between the back surface of the reflecting mirror 108c and the back cover 101c. The arm portion 121a of the connecting plate 121 and the light blocking means 110 are connected together by the fastening pins 125 which are fixed by being inserted through and fastened to holes provided in the arm portion 121a and the base 123. The bases 123 and 124 are fixed to the synthetic resin sheet material having light blocking characteristics by the fastening pins 126. The guide roller 127 and a guide roller 132 serve to change the direction of the diffusion means 130 according to the shape of the image display apparatus, and is rotatably supported on the body (not shown) and is maximized in diameter so that the light blocking means 110 is prevented from remaining permanently bent, as effectively as possible. The tension coil spring 128 is hooked on the base 124 at one end and on the body (not shown) at the other end to apply tension to the sheet material of the light blocking means 110 so that the sheet material is prevented from being deflected. The light-blocked state detecting switch 129a is fixed to the body (not shown) as position-of-light-blocking-means detecting means, and when the light blocking means 110 is in the light-blocked state, the slider 117 is moved down and the operating projection 117a presses the switch contact of the light-blocked state detecting switch 129a so that the light-blocked state detecting switch 129a is switched from off to on to detect that the light blocking means 110 is in the light-blocked state. The light-unblocked state detecting switch 129b is fixed to the body (not shown) as position-of-light-blocking-means detecting means, and when the light blocking means 110 is in the light-unblocked state, the slider 117 is moved up and the operating projection 117a presses the switch contact of the light-unblocked state detecting switch 129b so that the light-unblocked state detecting switch 129b is switched from off to on to detect that the light blocking means 110 is in the light-unblocked state.

Since the operation of the fourth embodiment is basically identical to that of the third embodiment, the description of the operation is omitted.

As described above, the diffusion means 130 is constructed as a parallel link structure which moves in only a plane, while the light blocking means 110 is constructed as a structure which moves a synthetic resin sheet material in a substantially expanded state. Accordingly, the driving loads of both means 130 and 110 can be reduced so that the driving speeds of both means 130 and 100 can be increased to quickly switch over an image writing state and an image reading state. Furthermore, since the light blocking means 110 is driven by a simple arrangement via the diffusion means 130, both the light blocking means 110 and the diffusion means 130 can be smoothly reciprocally driven. Accordingly, it is possible to provide an image display apparatus of high quality and good operability.

In addition, by efficiently utilizing the planar space between the back surface of the reflecting mirror 108c having a large area and the back cover 101c which serves as an external appearance member, it is possible to accommodate the light blocking means 110 in a substantially expanded state in a portion directly adjacent to an external appearance member without being covered with an extra member, thereby making it possible to greatly reduce the entire size of the image display apparatus.

In each of the third embodiment and the fourth embodiment, the constructions and the driving mechanisms of the light blocking means 110 and the diffusion means 130 are not limited to those described hereinabove. For example, instead of the aforesaid parallel link which is used as a construction which rotationally moves the light blocking means 110 or the diffusion means 130, a simple rotary blade may be arranged to cover or uncover the screen of the SLM. As a construction which rectilinearly moves the blades, a linear motor may be used in place of a rotational motor.

Although, in each of the above-described embodiments, images to be written to the spatial light modulation element are recorded on a film of the type which is accommodated in a film cartridge, another type of film can be adopted merely by modifying a mechanism for setting a film to an aperture position, without the risk of affecting either of the constructions of the light blocking means and the diffusion means which constitute the gist of the prevent invention. In other words, the effect of the present invention can be achieved irrespective of the kind of image to be written.

As described above, in accordance with the third and fourth embodiments, the light blocking means or the diffusion means of the image display apparatus is arranged to move in only a plane or in a substantially expanded state. Accordingly, the driving loads of the light blocking means and the diffusion means can be reduced so that the driving speeds of the light blocking means and the diffusion means can be increased to quickly switch over an image writing state and an image reading state. Accordingly, it is possible to improve the operability and the quality of the image display apparatus. Furthermore, both the light blocking means and the diffusion means can be smoothly reciprocally moved by a simple arrangement.

In addition, by efficiently utilizing the planar space between the back surface of the reflecting mirror having a large area and the external appearance member, it is possible to accommodate the light blocking means or the diffusion means in a substantially expanded state in a portion directly adjacent to an external appearance member without being covered with an extra member, thereby making it possible to reduce the entire size of the image display apparatus.

What is claimed is:

1. An image display apparatus comprising:
    a storage display element having a screen portion which receives image light from its back side and stores an image and displays the stored image on its front side; and
    a light blocking mechanism capable of being switched over between a light-blocked state in which said light blocking mechanism blocks light incident on the front side of said screen portion of said storage display element to shut off incidence of external light on said screen portion, and an observation-possible state in which said light blocking mechanism unblocks light incident on the front side of said screen portion of said storage display element.

2. An apparatus according to claim 1, wherein said light blocking mechanism has a light blocking member which moves on the front side of said screen portion.

3. An apparatus according to claim 2, wherein said light blocking member is a sheet-like member which has a light blocking portion and a light unblocking portion which are arranged in a transporting direction of said light blocking member, said sheet-like member being moved in the transporting direction so that said light blocking member is switched over between a state in which said light blocking portion is positioned at said screen portion and a state in which said light unblocking portion is positioned at said screen portion.

4. An apparatus according to claim 2, wherein said light blocking member is a blade-like member, said blade-like member being movable between a first position which blocks light incident on said screen portion and a second position which is withdrawn from said screen portion.

5. An apparatus according to claim 1, further comprising a projecting mechanism which projects an image from a developed film onto the back side of said storage display element.

6. An apparatus according to claim 5, wherein said light blocking mechanism is switched to the light-blocked state during projection by said projecting mechanism.

7. An apparatus according to claim 1, further comprising an illumination mechanism having an illumination element which illuminates said storage display element from the back side so that the image stored in said storage display element is made observable.

8. An apparatus according to claim 7, wherein said light blocking mechanism is switched to the observation-possible state when said storage display element is illuminated by said illumination mechanism to make the image observable.

9. An apparatus according to claim 2, wherein said light blocking mechanism has a motor as a driving source, and moves said light blocking member by controlling a rotation of said motor through circuit means.

10. An apparatus according to claim 9, wherein said light blocking member is switched between the light-blocked state and the observation-possible state by switch-over driving of said motor between forward and reverse.

11. An image display apparatus comprising:
    a storage display element having a screen portion which receives image light from its back side and stores an image and displays the stored image on its front side;
    an illumination element which illuminates said storage display element from the back side so that the image stored in said storage display element is made observable; and
    a diffusion mechanism which is disposed on the back side of said storage display element and is capable of being switched over between a light-transmitting state in which the image light is transmitted and guided to said storage display element and a light-diffusing state in which illumination light from said illumination element is diffused and guided to said storage display element.

12. An apparatus according to claim 11, wherein said diffusion mechanism has a diffusion member which moves on the back side of said storage display element.

13. An apparatus according to claim 12, wherein said diffusion member is a sheet-like member which has a light-transmitting portion and a light-diffusing portion which are arranged in a transporting direction of said light blocking member, said sheet-like member being moved in the transporting direction so that said diffusion member is switched over between a state in which said light-transmitting portion is positioned at said screen portion and a state in which said light-diffusing portion is positioned at said screen portion.

14. An apparatus according to claim 12, wherein said diffusion member is a blade-like member, said blade-like member being movable between a first position which is withdrawn from said screen portion and a second position which covers said screen portion.

15. An apparatus according to claim 11, further comprising a projecting mechanism which projects an image from a developed film onto the back side of said storage display element.

16. An apparatus according to claim 15, wherein said diffusion mechanism is switched to the light-transmitting state during projection by said projecting mechanism.

17. An apparatus according to claim 12, wherein said diffusion mechanism has a motor as a driving source, and moves said diffusion member by controlling a rotation of said motor through circuit means.

18. An apparatus according to claim 17, wherein said diffusion member is switched between the light-transmitting state and the light-diffusing state by switch-over driving of said motor between forward and reverse.

19. An apparatus according to claim 7, further comprising a diffusion mechanism which is disposed on the back side of said storage display element and is capable of being switched over between a light-transmitting state in which the image light is transmitted and guided to said storage display element and a light-diffusing state in which illumination light from said illumination element is diffused and guided to said storage display element.

20. An apparatus according to claim 19, wherein said diffusion mechanism has a diffusion member which moves on the back side of said storage display element.

21. An apparatus according to claim 19, further comprising a projecting mechanism which projects an image from a developed film onto the back side of said storage display element.

22. An apparatus according to claim 21, wherein, during projection by said projecting mechanism, said light blocking mechanism is switched to the light-blocked state, while said diffusion mechanism is switched to the light-transmitting state.

23. An apparatus according to claim 22, wherein, during illumination by said illumination mechanism, said light blocking mechanism is switched to the observation-possible state, while said diffusion mechanism is switched to the light-diffusing state.

* * * * *

UNITED STATES PATENT AND TRADEMARK OFFICE
CERTIFICATE OF CORRECTION

PATENT NO. : 6,164,780
DATED : December 26, 2000
INVENTOR(S) : Goro Noto et al.

It is certified that error appears in the above-identified patent and that said Letters Patent is hereby corrected as shown below:

Column 2,
Line 20, "SliM" should read -- SLM --.

Column 3,
Line 5, "no" should read -- an --.

Column 17,
Line 60, "llla" should read -- 111a --.

Column 19,
Line 28, "AS" should read -- As --.

Column 21,
Line 31, "prevent" should read -- present --.

Signed and Sealed this

Eleventh Day of December, 2001

Attest:

NICHOLAS P. GODICI
Attesting Officer   Acting Director of the United States Patent and Trademark Office